US008616949B2

(12) United States Patent
Okada

(10) Patent No.: US 8,616,949 B2
(45) Date of Patent: Dec. 31, 2013

(54) GAMING MACHINE ACCEPTING SIDE BET AND PLAYING METHOD THEREOF

(76) Inventor: Kazuo Okada, Koto-ku (JP)

( * ) Notice: Subject to any disclaimer, the term of this patent is extended or adjusted under 35 U.S.C. 154(b) by 255 days.

(21) Appl. No.: 12/779,342

(22) Filed: May 13, 2010

(65) Prior Publication Data

US 2010/0291988 A1 Nov. 18, 2010

(30) Foreign Application Priority Data

May 18, 2009 (JP) ................................ 2009-120256

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC ................ 463/11; 463/12; 463/13; 273/274; 273/292; 273/303

(58) Field of Classification Search

USPC ................ 273/274, 292, 303; 463/11, 12, 13

See application file for complete search history.

(56) References Cited

U.S. PATENT DOCUMENTS

| | | | | |
|---|---|---|---|---|
| 5,673,917 | A * | 10/1997 | Vancura | 273/292 |
| 6,523,829 | B1 * | 2/2003 | Walker et al. | 273/292 |
| 7,665,737 | B1 * | 2/2010 | Ramirez | 273/292 |
| 2005/0023758 | A1 * | 2/2005 | Noyes | 273/292 |
| 2006/0131809 | A1 * | 6/2006 | Lancaster et al. | 273/292 |
| 2007/0069469 | A1 * | 3/2007 | Silverman | 273/292 |
| 2008/0227513 | A1 | 9/2008 | Yoshizawa | |

FOREIGN PATENT DOCUMENTS

| | | |
|---|---|---|
| AU | 711529 | 10/1999 |
| AU | 764953 | 9/2003 |

OTHER PUBLICATIONS

U.S. Appl. No. 12/782,095, filed May 18, 2010, Inamura, et al.
U.S. Appl. No. 12/782,191, filed May 18, 2010, Munakata.
U.S. Appl. No. 12/782,260, filed May 18, 2010, Kitamura, et al.

* cited by examiner

*Primary Examiner* — Omkar Deodhar
*Assistant Examiner* — Adetokunbo O Torimiro
(74) *Attorney, Agent, or Firm* — KMF Patent Services, PLLC; S. Peter Konzel; Kenneth M. Fagin

(57) ABSTRACT

In the gaming machine according to the present invention, an attribute of a card to be compared with an attribute of a player additional card is determined. In a case where a side bet is placed, a result of the side game is determined by determining whether or not the attribute of the player additional card is same as the determined attribute. The additional payout is offered based on the determined result of the side game.

6 Claims, 29 Drawing Sheets

FIG. 2

| Relationship between attribute of player additional card and compared attribute | Result of side game | Additional payout amount (※3) |
|---|---|---|
| Same number and same suit | PERFECT NUMBER | 50 |
| Same number | NUMBER | 10 |
| Same suit(※1) | suit | 2 |
| Same suit(※2) | NO PAIR | 0 |
| Others | NO PAIR | 0 |

※1 Suit is selected as a compared attribute
※2 Number and suit are selected as compared attributes
※3 Additional payout amount when 1 credit is side-betted

FIG. 15

| Side bet amount | Number of compared cards |
|---|---|
| ～9 | 1 |
| 10～99 | 2 |
| 100～ | 3 |

FIG. 19

| Total of numbers allocated to cards just before Double Down (*) <Total just before Double Down> | Success rate of Double Down |
|---|---|
| · | · |
| · | · |
| 8 | 40 |
| 9 | 50 |
| 10 | 60 |
| 11 | 70 |
| 12 | 45 |
| 13 | 35 |
| · | · |
| · | · |

(*) Multiple cards displayed in player card display area when Double Down command is inputted

GAMING MACHINE ACCEPTING SIDE BET AND PLAYING METHOD THEREOF

CROSS-REFERENCE TO RELATED APPLICATIONS

This application is based upon and claims a priority from the prior Japanese Patent Application No. 2009-120256 filed on May 18, 2009, the entire contents of which are incorporated herein by reference.

BACKGROUND OF THE INVENTION

1. Field of the Invention

The present invention relates to a gaming machine accepting a side bet and a playing method thereof.

2. Discussion of the Background

Conventionally, gaming machines capable of accepting a side bet different from a normal bet have been provided.

For example, Patent Documents 1 to 3 disclose gaming machines in which a sub game (side game) is played aside from a basic game (normal Blackjack game) on condition that a side bet has been placed. In such gaming machines, a result of the side game is determined based on cards distributed to players in a Blackjack game.

In a card game such as Blackjack, each combination of cards is allocated with a different strength, and winning or losing of the game is determined by comparing the strength between the combination of the cards distributed to a player (player cards) and the combination of the cards distributed to a dealer (dealer cards). A predetermined number (e.g. two in Blackjack) of cards (hereinafter, referred to as player initial cards) are normally distributed to a player when a game is started. Then, the player may request for distribution of another card to add that card (hereinafter, referred to as a player additional card) to the player initial cards or to exchange that card with one of the player initial cards. Through these actions, the player plays the game with an aim of having a combination of the player cards stronger than a combination of the dealer cards.

In this context, the player additional card makes a difference in the result of the game and is a significantly important card for the player. Accordingly, the player waits for the distribution of the player additional card after making a request for the distribution with a feeling of hope for a good player additional card. Such feeling is one of the attractive points of the game for the player playing card games.

Patent Document 1: AU 711529

Patent Document 2: AU 764953

Patent Document 3: US 2008/0227513-A1

SUMMARY OF THE INVENTION

Against this background, the present inventors have arrived at the following idea. Associating a player additional card with a side-bet function in a gaming machine accepting a side bet may increase the player's feeling of hope for a good player additional card, leading to a more interesting card game.

The present invention was made in view of the above mentioned ideas, and an object thereof is to provide a gaming machine capable of offering a more interesting card game by increasing the player's feeling of hope for a good player additional card; and a playing method thereof.

The present invention provides a gaming machine having the following configuration.

That is, the gaming machine comprises: a display capable of displaying a plurality of cards; an input device with which a player can input a command in a game; and a controller. The controller is programmed to execute the processing of: (A) accepting an input for placing a normal bet from the input device; (B) displaying a player initial card on the display; (C) accepting an input of an additional command from the input device after the player initial card is displayed, the additional command being for displaying a player additional card that is different from the player initial cards; (D) accepting an input for placing a side bet different from the normal bet from the input device; (E) determining an attribute of a card to be compared with an attribute of the player additional card; (F) displaying the player additional card on the display when the additional command is inputted in the processing (C); (G) determining, when the side bet is placed in the processing (D), a result of a side game by determining whether or not the attribute of the player additional card displayed in the processing (F) is same as the attribute of the card determined in the processing (E); (H) displaying dealer cards on the display; (I) determining a result of a normal game based on the dealer cards displayed in the processing (H) and player cards specified by the player initial card displayed in the processing (B) and the player additional card displayed in the processing (F); and (J) offering a normal payout based on the result of the normal game determined in the processing (I) and an additional payout based on the result of the side game determined in the processing (G).

According to the gaming machine, the attribute of a card to be compared with the attribute of the player additional card is determined. For example, the attribute of a card to be compared (hereinafter, referred to as a compared attribute) may be selected by a player, or alternatively, the compared attribute may be randomly selected in the gaming machine. Examples of the attribute include the number and the suit drawn on playing cards.

In a case where a side bet has been placed, a result of a side game is determined by determining whether or not the attribute of the player additional card is same as the compared attribute. The additional payout is offered based on the result of the side game.

Namely, the player additional card not only makes a difference in the result of a normal game, but also makes a difference in the result of the side game (i.e. whether or not the player can get the additional payout). Therefore, the type of the card to be distributed as the player additional card is significantly important for the player.

Accordingly, the player waits for the distribution of the player additional card after making a request for the distribution with a feeling of hope for a good player additional card.

According to the gaming machine, the player's feeling of hope for a good player additional card can be increased as above, resulting in a more interesting card game.

Further, the present invention provides a gaming machine having the following configuration.

That is, the gaming machine comprises: a display capable of displaying a plurality of cards; an input device with which a player can input a command in a game; and a controller. The controller is programmed to execute the processing of: (A) accepting an input for placing a normal bet from the input device; (B) displaying a player initial card on the display; (C) accepting an input of an additional command from the input device after the player initial card is displayed, the additional command being for displaying a player additional card that is different from the player initial cards; (D) accepting an input for placing a side bet different from the normal bet from the input device; (E) accepting an input for selecting an attribute of a card to be compared with an attribute of the player additional card from the input device; (F) displaying the player additional card on the display when the additional command is inputted in the processing (C); (G) determining, when the side bet is placed in the processing (D), a result of a side game by determining whether or not the attribute of the player additional card displayed in the processing (F) is same as the attribute of the card selected in the processing (E); (H) displaying dealer cards on the display; (I) determining a result of a normal game based on the dealer cards displayed in the processing (H) and player cards specified by the player initial card displayed in the processing (B) and the player additional card displayed in the processing (F); and (J) offering a normal payout based on the result of the normal game determined in the processing (I) and an additional payout based on the result of the side game determined in the processing (G)

The gaming machine accepts an input for selecting the attribute (compared attribute) of a card to be compared with the attribute of the player additional card from the input device. Namely, the player can select the compared attribute by using the input device.

In a case where a side bet has been placed, a result of a side game is determined by determining whether or not the attribute of the player additional card is same as the compared attribute. The additional payout is offered based on the result of the side game.

Namely, the player additional card not only makes a difference in the result of a normal game, but also makes a difference in the result of the side game (i.e. whether or not the player can get the additional payout). Therefore, the type of the card to be distributed as the player additional card is significantly important for the player.

Accordingly, the player waits for the distribution of the player additional card after making a request for the distribution with a feeling of hope for a good player additional card.

According to the gaming machine, the player's feeling of hope for a good player additional card can be increased as above, resulting in a more interesting card game.

Further, in the gaming machine, the player has a chance to select the compared attribute, and therefore, the player can predict the attribute of the player additional card through the selection of the compared attribute. Accordingly, the player can enjoy anticipating whether or not his or her prediction comes true. In addition, a player's own selection of the compared attribute may increase the player's fondness for the compared attribute. This also increases player's interest in the player additional card, leading to a further enhanced feeling of hope for a good player additional card.

Further, the gaming machine of the present invention desirably has a following configuration.

Namely, each card has a first attribute and a second attribute. The processing (E) includes determining the first attribute and the second attribute of a card to be compared with the first attribute and the second attribute of the player additional card. The processing (G) includes determining, when the side bet is placed in the processing (D), the result of the side game by determining whether or not at least one of the first attribute and the second attribute of the player additional card displayed in the processing (F) is same as the first attribute or the second attribute of the card determined in the processing (E).

In the gaming machine, the first attribute (e.g. number) and the second attribute (e.g. suit) are determined as the compared attributes. The result of a side game is determined by determining whether or not at least one of the first attribute and the second attribute of the player additional card is same as the determined first attribute or the second attribute. For example, the additional payout may be offered when the number determined as the compared attribute is same as the number allocated to the player additional card even when the suit determined as the compared attribute is different from the suit allocated to the player additional card.

As above, the additional payout may be offered even when one of the first and second attributes determined as the compared attributes is different from the corresponding attribute allocated to the player additional card. Accordingly, it is possible to please the player who may be disappointed because the first and second attributes determined as the compared attributes are not completely same as the first and second attributes allocated to the player additional card.

Further, the present invention desirably has the following configuration.

Namely, the processing (E) includes determining at least one attribute of a card to be compared with the attribute of the player additional card, the number of the at least one attribute of a card being increased corresponding to the amount of side-betted game media.

According to the gaming machine, the number of the compared attributes may be increased along with the increase of the amount of the side-betted game media. Therefore, the probability that the compared attribute is same as the attribute of the player additional card may be increased. Accordingly, the gaming machine can encourage the player who wishes to get an additional payout to bet a larger amount of game media as a side bet, resulting in the profit increase of the casino.

In addition, after comparing the attribute of the player additional card with one compared attribute, the player can further compare the attribute of the player additional card with another compared attribute. Accordingly, the player is allowed to fully enjoy comparing of the attributes.

Further, the present invention desirably has the following configuration.

Namely, each card has a number. The processing (I) includes determining the result of the normal game by comparing a total of the numbers allocated to the player cards and a total of the numbers allocated to the dealer cards. The additional command includes a special additional command for further betting game media aside from the normal bet in the processing (A) and for displaying the player additional card. The processing (C) includes accepting the input of the additional command from the input device on condition that the special additional command is not inputted. The processing (J) includes paying out, when the special additional command is inputted in the processing (C), more game media compared to a case where the special additional command is not inputted as the normal payout. The gaming machine further includes a memory for storing data of high success rate with special additional command indicative of a total of the numbers allocated to the player cards, the total of the numbers indicating a comparatively high probability of player's winning in the normal game with the special additional command inputted. The controller is further programmed to execute the processing of (K) determining, based on the data of high success rate with special additional command stored in the memory, whether or not the total of the numbers allocated to the player initial card displayed in the processing (B) and the player additional card displayed in the processing (F) is same as the total of the numbers indicated by the data of high success rate with special additional command. The processing (D) includes accepting an input for placing the side bet from the input device, when determining the total of the numbers allocated to the player initial card displayed in the processing (B) and the player additional card displayed in the processing (F) is same as the total of the numbers indicated by the data of high success rate with special additional command in the processing (K).

According to the gaming machine, the additional command includes a special additional command. The special additional command is a command requesting for distribution of just one more player additional card (e.g. Double Down in Blackjack). Namely, once inputting a special additional command, the player cannot input another additional command in that game. Though the special additional command requires additional bet of the game media aside from the normal bet, the amount of game media to be paid out as a normal payout is larger than the amount of game media to be paid out in the case where the special additional command is not inputted. Accordingly, the player tends to input the special additional command in a case where just one more player additional card relatively increases the probability of player's winning in the normal game. In Blackjack, for example, the player tends to choose Double Down when the total of the numbers allocated to the cards distributed to the player so far is 11.

As above described, the player gambles for the winning in that game by inputting the special additional command. However, It maybe difficult for a beginner player to know when to input the special additional command.

The above gaming machine accepts an input for placing a side bet on condition that the player has the distributed cards with which the player has a relatively-increased probability of winning in the normal game with one more player additional card. Namely, the above gaming machine accepts an input for placing a side bet when the timing of inputting the special additional command has come. Accordingly, the player can know the timing of inputting the special additional command by checking whether or not the side bet can be placed. Accordingly, the above gaming machine can inform even a beginner player when to input the special additional command.

Only one more player additional card is distributed when the special additional command is inputted. Accordingly, the player additional card to be distributed next determines the result of the normal game. In this regard, the player is greatly interested in the type of the player additional card to be distributed and has a feeling of hope for a good player additional card.

As above, the player additional card already raising the player's hope also determines the result of the side game, and therefore, the player tends to have a greater hope for a good player additional card.

The present invention also provides a playing method of a card game having the following configuration.

Namely, a playing method of a card game comprises the steps of: (A) accepting a normal bet; (B) distributing a player initial card to a player; (C) accepting an additional command for requesting distribution of a player additional card different from the player initial cards after the player initial card is distributed; (D) accepting aside bet different from the normal bet; (E) determining an attribute of a card to be compared with an attribute of the player additional card; (F) distributing the player additional card to the player when the additional command is made in the step (C); (G) determining, when the side bet is placed in the step (D), a result of a side game by determining whether or not the attribute of the player additional card distributed in the step (F) is same as the attribute of the card determined in the step (E); (H) distributing dealer cards to a dealer; (I) determining a result of a normal game based on the dealer cards distributed in the step (H) and player cards specified by the player initial card distributed in the step (B) and the player additional card distributed in the step (F); and (J) offering a normal payout based on the result of the normal game determined in the step (I) and an additional payout based on the result of the side game determined in the step (G).

According to the above playing method of a card game, the attribute of a card to be compared with the attribute of the player additional card is determined. For example, the attribute of a card to be compared (hereinafter, referred to as a compared attribute) may be selected by a player, or alternatively, the compared attribute may be randomly determined by the dealer. Examples of the attribute include the number and the suit drawn on playing cards.

In a case where a side bet has been placed, a result of the side game is determined by determining whether or not the attribute of the player additional card is same as the compared attribute. The additional payout is offered based on the result of the side game.

Namely, the player additional card not only makes a difference in the result of a normal game, but also makes a difference in the result of the side game (i.e. whether or not the player can get the additional payout). Therefore, the type of the card to be distributed as the player additional card is significantly important for the player.

Accordingly, the player waits for the distribution of the player additional card after making a request for the distribution with a feeling of hope for a good player additional card.

According to the playing method of a card game, the player's feeling of hope for a good player additional card is increased as above, resulting in a more interesting card game.

The present invention provides a gaming machine capable of increasing the player's feeling of hope for a good player additional card, leading to a more interesting card game; and a playing method thereof.

BRIEF DESCRIPTION OF THE DRAWINGS

FIG. 2 is a table for explaining relationships between results of the side game and additional payouts;

FIG. 15 is a view illustrating relationships between side bet amounts and the number of compared cards;

FIG. 19 is a table illustrating relationships between the totals just before Double Down and success rates of Double Down;

DESCRIPTION OF THE EMBODIMENTS

Figure 1A:
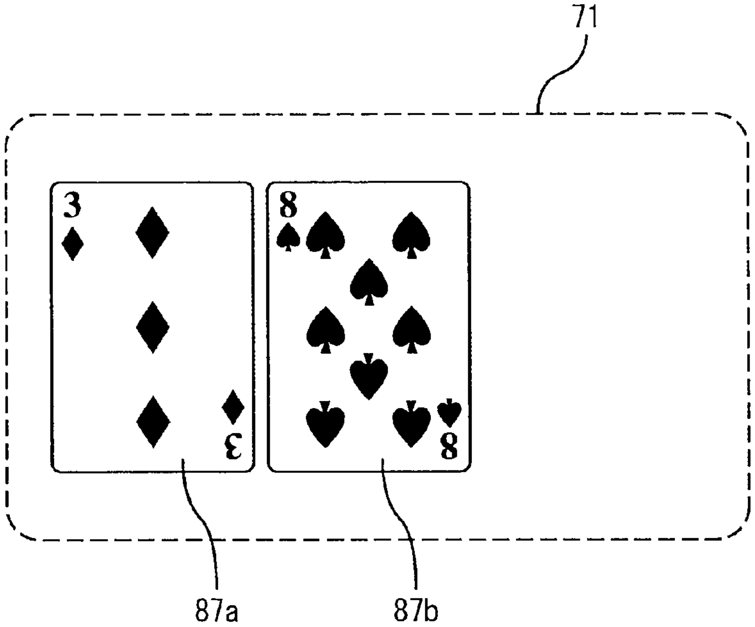
FIG. 1A is a view illustrating an exemplary image displayed on a liquid crystal display in a gaming machine according to a first embodiment.

Hereinafter, embodiments (first embodiment to third embodiment) of the present invention will be described.

A gaming machine 1 according to the embodiments of the present invention executes a Blackjack game.

First, a Blackjack game will be described. It is to be noted the Blackjack game described here corresponds to the normal game of the present invention.

In a Blackjack game, six decks or eight decks of playing cards (52 cards in one deck) are used. One or more players play a game against a dealer. Each card has one number and one suit drawn thereon. The number drawn on each card is one of "2", "3", "4", "5", "6", "7", "8", "9", "10", "J", "Q", "K", and "A". The suit drawn on each card is one of "Spades", "Hearts", "Diamonds", and "Clubs". The number corresponds to the first attribute of the present invention and the suit corresponds to the second attribute of the present invention.

Note that, in the present description, symbols "J", "Q", "K", and "A" are also called numbers.

The height is compared between the card total of the cards distributed to the player (player cards) and the card total of the cards distributed to the dealer (dealer cards) to determine the result of a game. It is to be noted that one who has the card total (total of the numbers drawn on cards) larger than 21 loses the game. Accordingly, the player plays a game to get a higher card total without going over 21. In the Blackjack game, the card total is calculated as follows. Namely, "A" values 1 or 11, a face card ("J", "Q", and "K") values 10, and other cards with a number 2 to 10 value as that value.

Specifically, a Blackjack game is played as follows.

First, two cards are respectively distributed to players having placed normal bets and to a dealer. The two cards distributed to each player are referred to as player initial cards in the present description.

After receiving the cards, each player selects one of options including "hit", "stand", "split", and "double down".

Selecting "hit" corresponds to a request for another card.

Selecting "stand" corresponds to requesting no more cards.

"Split" can be selected when the player received two cards of the same value. The player splits these two cards and receives a new card to pair with each split card so as to play two separate hands.

Selecting "double down" corresponds to doubling the normal bet amount in exchange for requesting only one more card.

The additional command of the present invention includes "hit" and "double down". Further, "double down" corresponds to the special additional command of the present invention.

A card to be distributed in "hit" or "double down" is referred to as a player additional card in the present description.

After hands of all the players playing the game are fixed, the dealer hits the card until the dealer has the card total of 17 or more. Then, the card total of the dealer and the card total of the player are compared to determine the result of the game. In the case of player's winning, the player gets a profit corresponding to the amount of the normal bet. In the case of dealer's winning, on the other hand, the player loses the amount of the normal bet.

In a case where initially received cards are a "A" card and a card valuing 10 (Blackjack hand is established), the two-card total of 21 is higher as a hand than the three-or-more-card total of 21. In the case where the player establishes a Blackjack hand, the player can get a profit corresponding to 1.5 times of the normal bet.

There has been described a Blackjack game.

In a gaming machine 1 according to the embodiments of the present invention, a side game is played aside from a Blackjack game.

In the following, the side game according to first to third embodiments is described with reference to drawings.

[First Embodiment]

First, an outline of the first embodiment is described with reference to FIG. 1 (FIG. 1A to FIG. 1I) and FIG. 2.

FIGS. 1A to 1I are views each illustrating an exemplary image displayed on a liquid crystal display in a gaming machine according to the first embodiment.

FIG. 2 is a table for explaining relationships between results of the side game and additional payouts.

FIG. 1A illustrates two player initial cards 87 (player initial cards 87*a* and 87*b*) displayed in a player card display area 71. The player card display area 71 is provided in a liquid crystal display 10 (see FIG. 7).

Figure 1B:
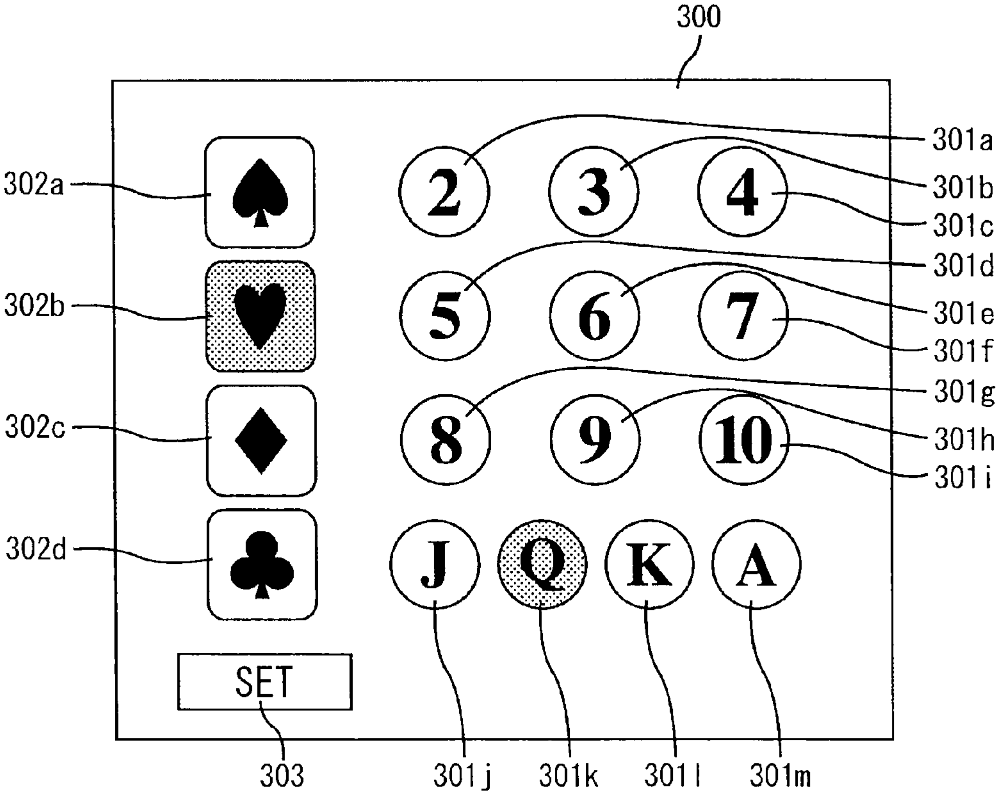
FIG. 1B is a view illustrating an exemplary image displayed on the liquid crystal display in the gaming machine according to the first embodiment.
Figure 7:
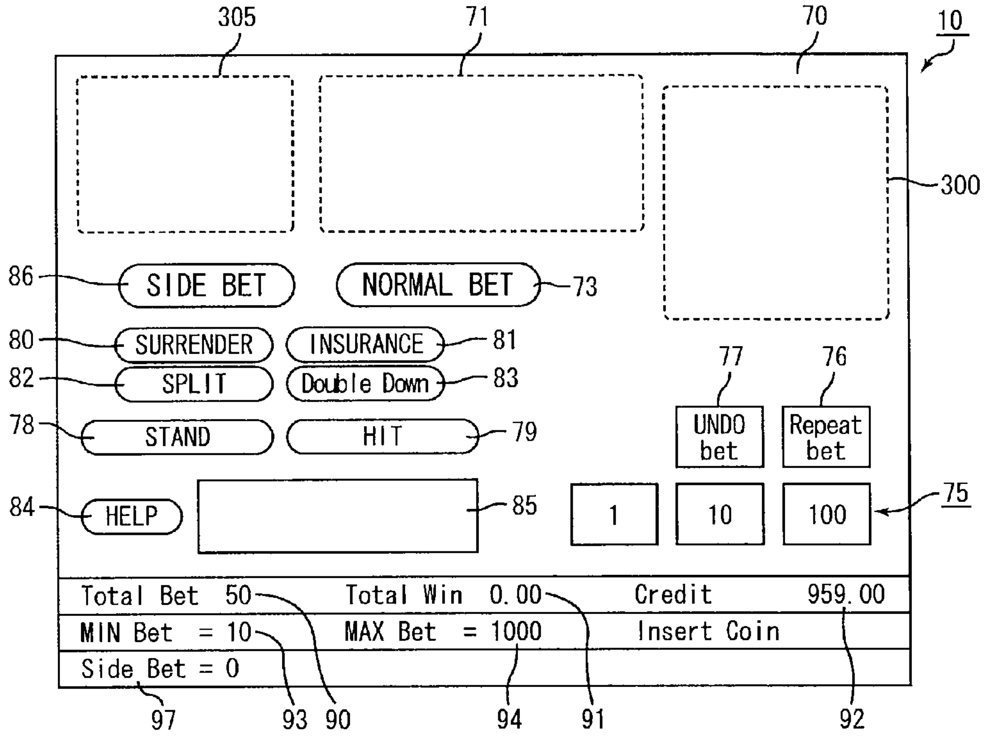
FIG. 7 is an explanatory view illustrating a game screen displayed on the liquid crystal display of one of the player terminals according to one embodiment of the present invention.

After two player initial cards 87 are displayed, a player is allowed to place a side bet by touching a side bet button 86 (see FIG. 7). The player having placed a side bet can select a number and a suit as compared attributes by operating a touch panel 11 in a display area 300 of compared-attribute selection buttons as illustrated in FIG. 1B. The display area 300 of compared-attribute selection buttons is an area provided in a liquid crystal display 10 (see FIG. 7). The touch panel 11 is provided on the front face of the liquid crystal display 10.

FIG. 1B illustrates number selection button images 301 (number selection button images 301*a* to 301*m*), suit selection button images 302 (suit selection button image 302*a* to 302*d*), and a set button image 303 displayed in the display area 300 of compared-attribute selection buttons.

By touching a position on the touch panel 11 corresponding to any of the number selection button images 301, the player can select a number. Also, touching a position on the touch panel 11 corresponding to any of the suit selection button images 302, the player can select a suit.

Note that the button images such as the number selection button images 301 and the suit selection button images 302 are also referred to simply as buttons herein.

Touching a position on the touch panel 11 corresponding to any of the button images is also referred to as "pressing (turning on) a button". For example, touching a position on the touch panel 11 corresponding to a number selection button image 301 is also referred to as "pressing (turning on) the number selection button". Further, touching a position on the touch panel 11 corresponding to a suit selection button image 302 is also referred to as "pressing (turning on) the suit selection button".

Furthermore, touching a position on the touch panel 11 corresponding to any of the button images is also referred to as "touching a button".

The player can set the number and the suit to be selected by touching a position on the touch panel 11 corresponding to the set button image 303.

FIG. 1B illustrates "Q" and "Heart" selected as the compared attributes by the player.

Figure 1C:
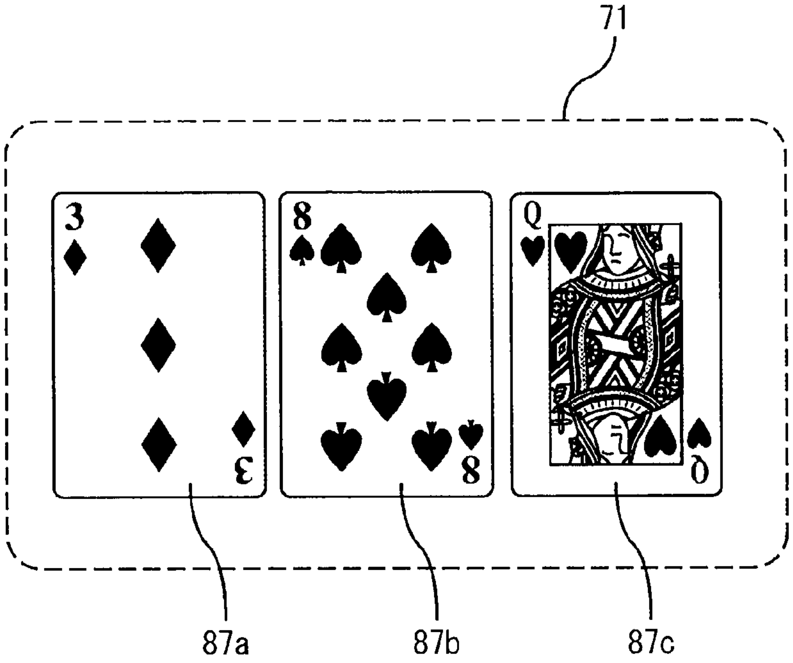
FIG. 1C is a view illustrating an exemplary image displayed on the liquid crystal display in the gaming machine according to the first embodiment.

Then, in a case where the player selects "hit" or "double down", a player additional card is distributed to the player. FIG. 1C illustrates a player additional card 87*c* displayed in addition to the player initial cards 87*a* and 87*b* in the player card display area 71.

Here, the number drawn on the player additional card 87*c* is "Q" that is selected as the compared attribute by the player, and the suit drawn on the player additional card 87*c* is "Heart" that is selected as the compared attribute by the player.

Namely, the number on the player additional card is same as the number selected as the compared attribute by the player, and the suit on the player additional card is same as the suit selected as the compared attribute by the player. In such a case, the result of the side game is "PERFECT NUMBER".

Figure 1D:
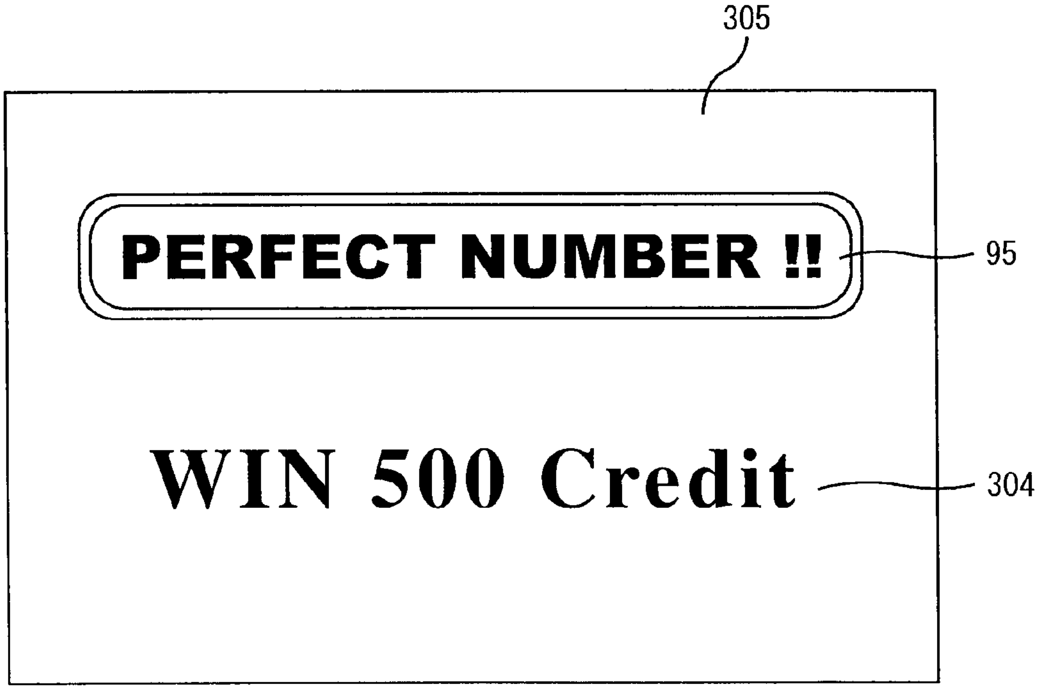
FIG. 1D is a view illustrating an exemplary image displayed on the liquid crystal display in the gaming machine according to the first embodiment.

FIG. 1D illustrates a side-game-result image 95 and an additional-payout image 304 displayed in a game-result display area 305. The game-result display area 305 is an area provided in the liquid crystal display 10 (see FIG. 7).

The side-game-result image 95 is an image showing the result of the side game.

In FIG. 1D, the side-game-result image 95 shows characters "PERFECT NUMBER" as the result of the side game is "PERFECT NUMBER".

The additional-payout image 304 shows a credit amount (additional payout amount) to be paid out based on the result of the side game.

FIG. 2 shows the additional payout amounts in association with the results of the side game in a case where one credit is side-betted. Namely, the additional payout amount is obtained by multiplying the value set in association with the result of the side game in FIG. 2 by the number of side-betted credits.

In FIG. 1D, the additional payout amount is 500 (50×10) credits as the number of side-betted credits is 10 and the result of the side game is "PERFECT NUMBER".

There has been described a case where the additional payout is offered when the number and the suit drawn on the player additional card are same as the number and the suit selected as the compared attributes by the player. However, the case in which the additional payout is offered is not limited to this case in the first embodiment.

Figure 1E:
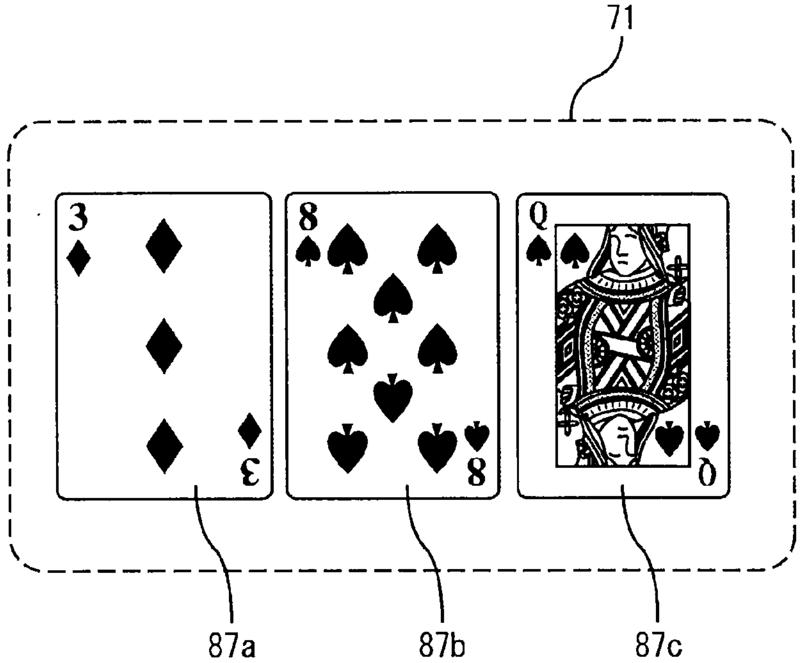
FIG. 1E is a view illustrating an exemplary image displayed on the liquid crystal display in the gaming machine according to the first embodiment.

In FIG. 1E, though the number drawn on the player additional card 87*c* is same number of "Q" that is selected as the compared attribute by the player, the suit drawn on the player additional card 87*c* is "Club" that is different from "Heart" selected as the compared attribute by the player.

Namely, though the number drawn on the player additional card is same as the number selected as the compared attribute by the player, the suit drawn on the player additional card is different from the suit selected as the compared attribute by the player. In such a case, the result of the side game is "NUMBER".

Figure 1F:
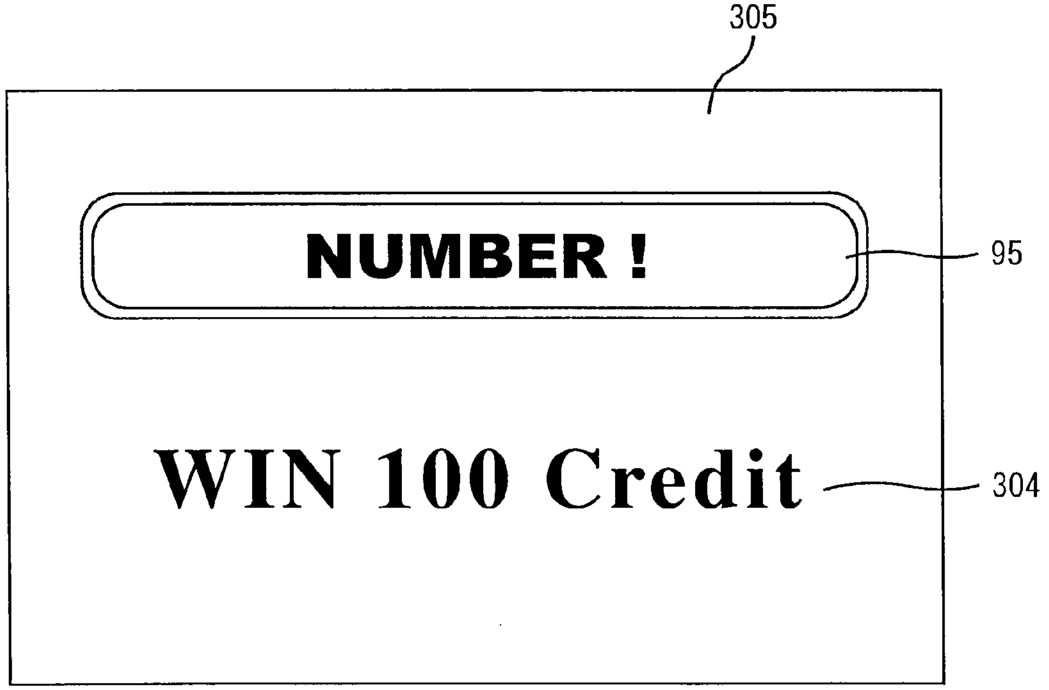
FIG. 1F is a view illustrating an exemplary image displayed on the liquid crystal display in the gaming machine according to the first embodiment.

In FIG. 1F, the side-game-result image 95 shows characters "NUMBER" as the result of the side game is "NUMBER".

Further, the additional-payout image 304 shows that the additional payout amount is 100 (10×10) credits as the number of side-betted credits is 10 and the result of the side game is "NUMBER".

As above, in the first embodiment, the additional payout is offered even in a case where the number on the player additional card is same as the number selected as the compared attribute and the suit on the player additional card is not same as the suit selected as the compared attribute.

There has been described a case where the player can select both the number and the suit as the compared attributes. However, in the first embodiment, the player may be allowed to select only a number or a suit.

Figure 1G:
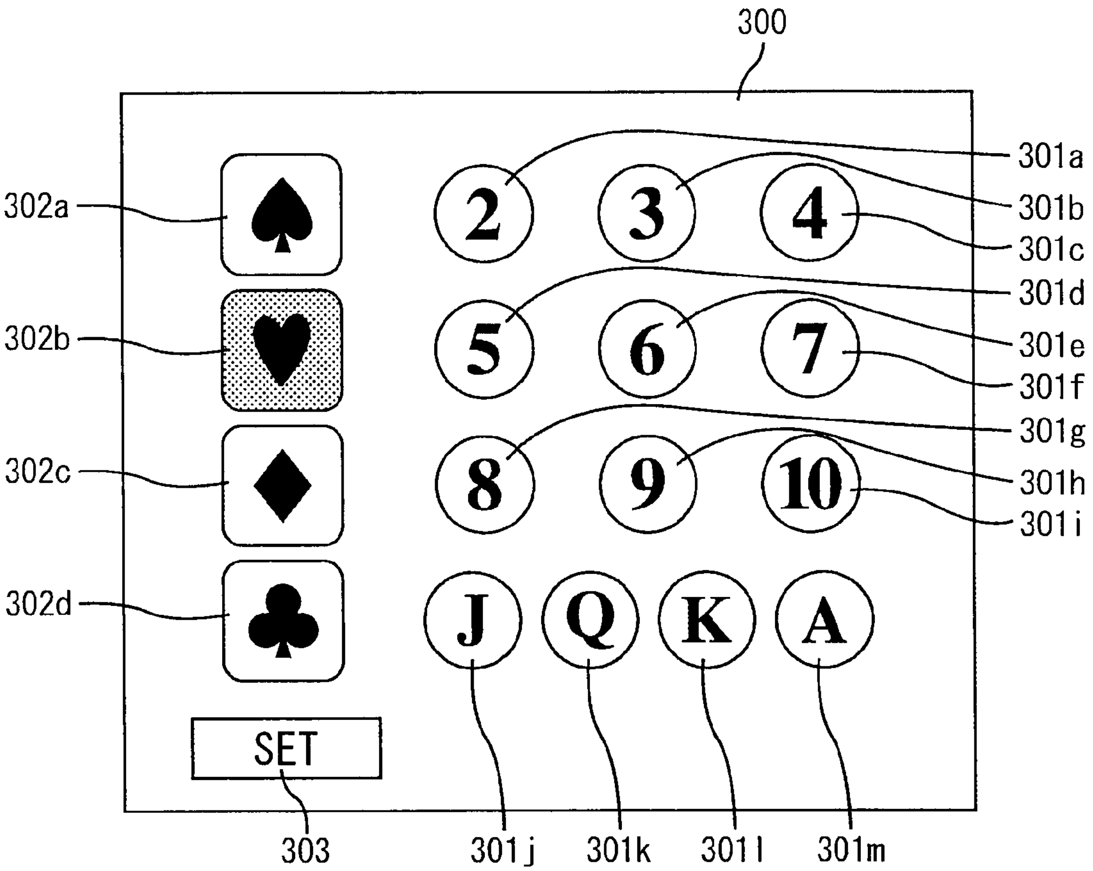
FIG. 1G is a view illustrating an exemplary image displayed on the liquid crystal display in the gaming machine according to the first embodiment.

FIG. 1G illustrates "Heart" selected as the compared attribute by the player.

Figure 1H:
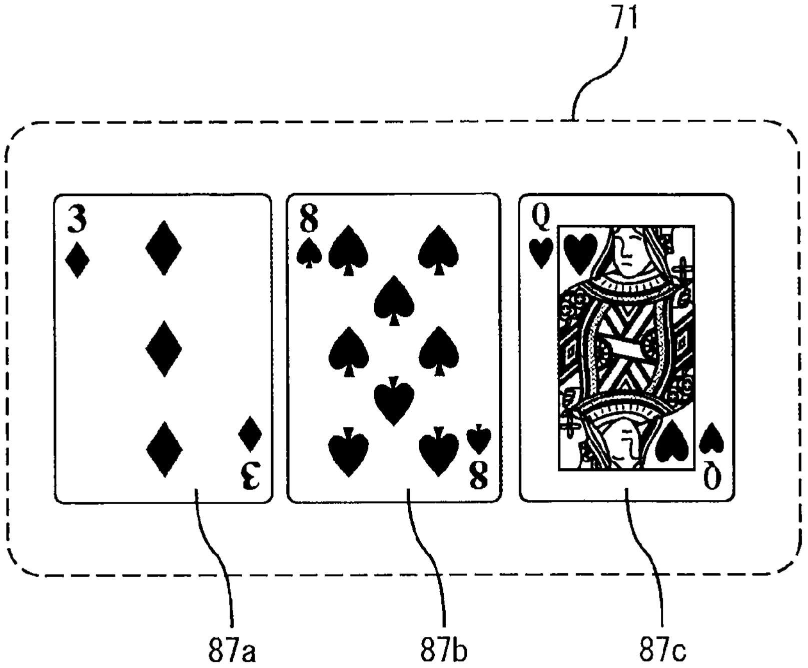
FIG. 1H is a view illustrating an exemplary image displayed on the liquid crystal display in the gaming machine according to the first embodiment.

FIG. 1H illustrates the player additional card 87*c* having a number of "Q" and a suit of "Heart" distributed thereafter.

Here, the suit drawn on the player additional card 87*c* is "Heart" that is selected as the compared attribute by the player.

Namely, the suit drawn on the player additional card is same as the suit selected as the compared attribute by the player. In such a case, the result of the side game is "Suit".

Figure 1I:
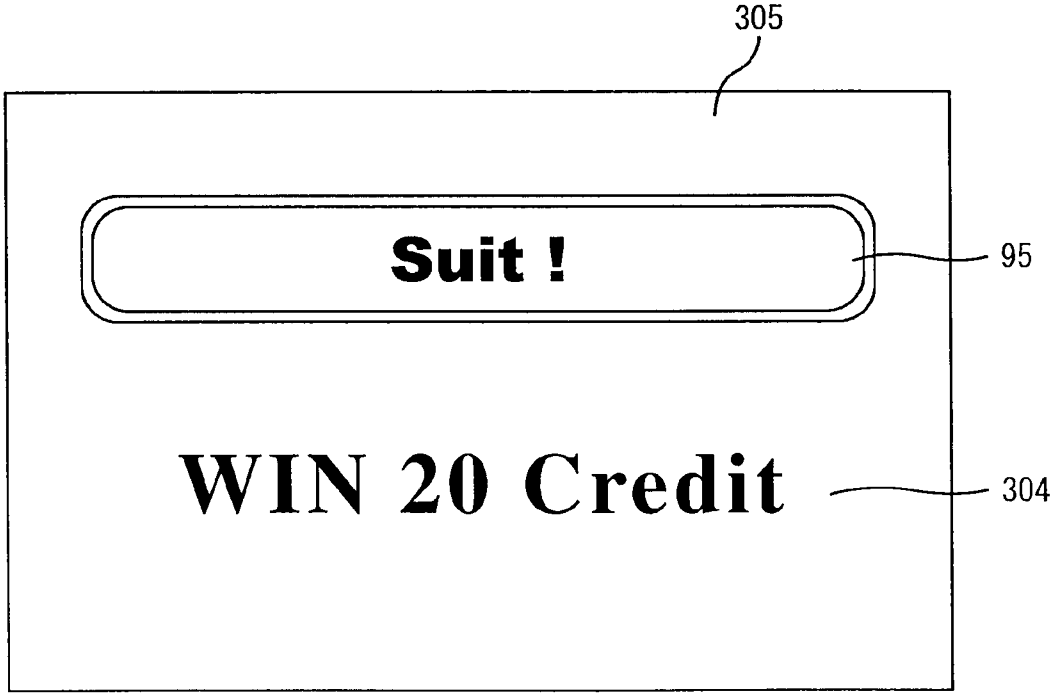
FIG. 1I is a view illustrating an exemplary image displayed on the liquid crystal display in the gaming machine according to the first embodiment.

In FIG. 1I, the side-game-result image 95 shows characters "Suit" as the result of the side game is "Suit".

Further, the additional-payout image 304 shows that the additional payout amount is 10 (2×10) credits as the number of side-betted credits is 10 and the result of the side game is "Suit".

In the first embodiment, the additional payout is offered when the player selects only a suit as the compared attribute and the suit is same as the suit drawn on the player additional card. However, the additional payout is not offered when the player selects both the number and the suit as the compared attributes and only the suit is same as the suit drawn on the player additional card (see FIG. 2).

As above, there has been described the outline of the first embodiment with reference to FIG. 1 and FIG. 2.

Hereinafter, the first embodiment will be further described in detail.

In the following, an outline of the gaming machine 1 according to the present embodiment will be described in detail with reference to the accompanying drawings. The gaming machine 1 according to the present embodiment is a kind of multiplayer participation gaming machine. Accordingly, the gaming machine 1 is provided with a plurality of player terminals 4 (see FIG. 3). In the gaming machine 1, Blackjack, one of card games, is executed.

First, a general structure of the gaming machine 1 according to the present embodiment will be described in detail with reference to accompanying drawings.

Figure 3:
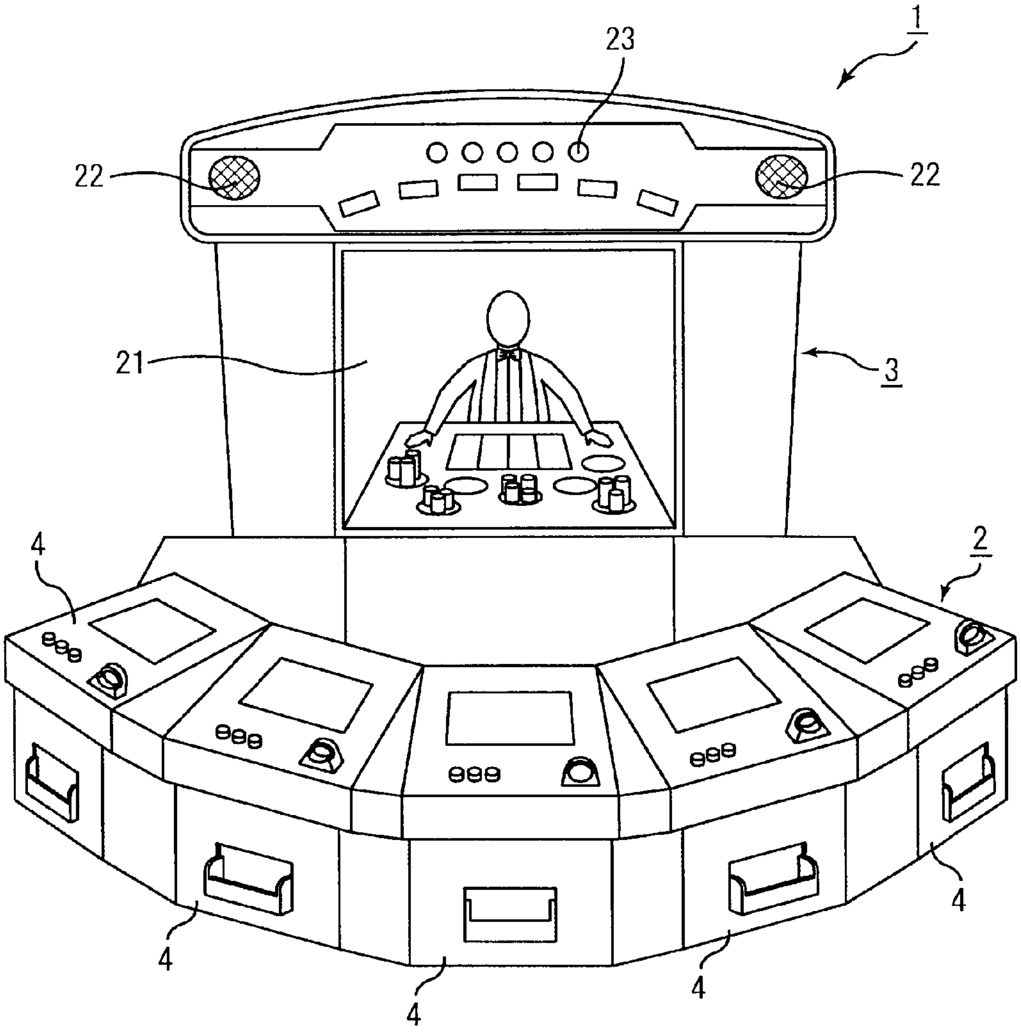
FIG. 3 is an outline view of a gaming machine according to one embodiment of the present invention.

FIG. 3 is an outline view of the gaming machine 1 according to one embodiment of the present invention.

The gaming machine 1 according to the present embodiment is basically provided with a table portion 2 and a panel portion 3. The table portion 2 is a portion enabling players to play a game by taking a seat, and has the plurality of player terminals 4 described above. The panel portion 3 is set up in a front direction of the players taking a seat at the table portion 2. This panel portion 3 is provided with a front display 21, as described later. The front display 21 displays an animation image of a dealer or the like in accordance with the progress of a game.

Next, the table portion 2 constituting the gaming machine 1 will be described in detail with reference to the accompanying drawings. As shown in FIG. 3, the table portion 2 has the plurality of (five in FIG. 3) player terminals 4 arranged in a general fan shape.

In this context, the structure of one player terminal 4 that constitutes the table portion 2 will be described in detail with reference to an accompanying drawing.

Figure 4:
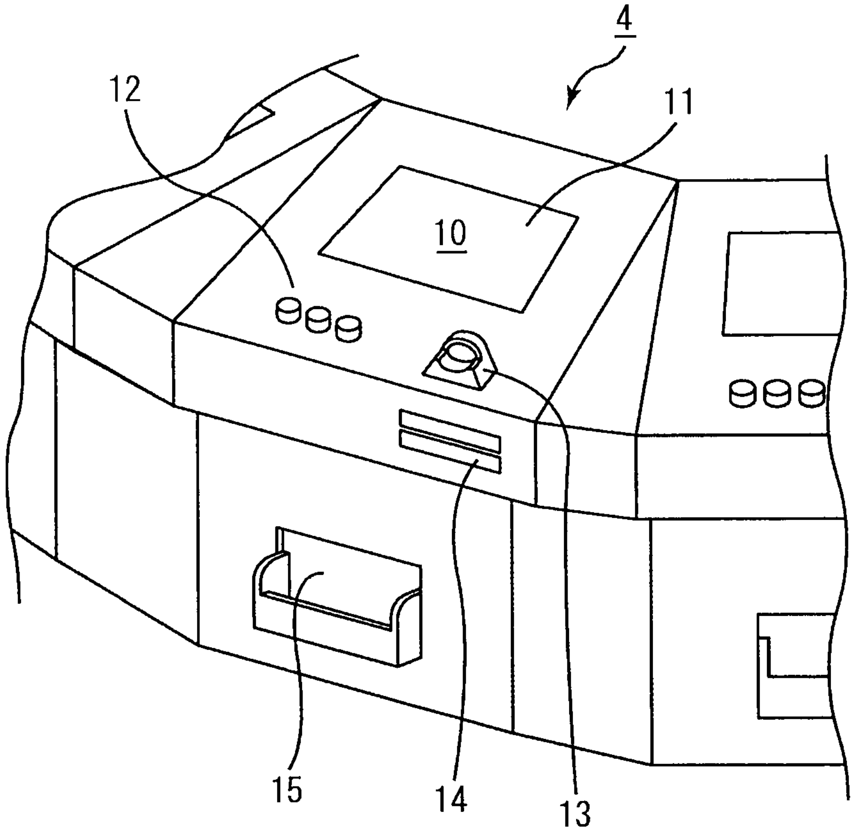
FIG. 4 is an outline view of a player terminal in one embodiment of the present invention.

FIG. 4 is an outline view illustrating one player terminal 4 according to one embodiment of the present embodiment.

Each of the player terminals 4 constituting the table portion 2 has the same structure.

As shown in FIG. 4, one player terminal 4 includes a liquid crystal display 10, a touch panel 11, an operation button 12, a coin insertion slot 13, a bill insertion slot 14, and a coin exit 15. The liquid crystal display 10 is a display device that displays a game screen (see FIG. 1 and FIG. 7), the results of the game or the like described later. The touch panel 11 is arranged on the front face of the liquid crystal display 10. The touch panel 11 is used to select a bet target or to set a bet amount with a game screen 70 displayed on the liquid crystal display 10. That is, the touch panel 11 functions as an operating unit for selecting the bet target or setting the bet amount. The operation buttons 12 are operating units for making operations such as a payout operation in the gaming machine 1. The coin insertion slot 13 is a portion for a player to insert coins or medals. The bill insertion slot 14 is a portion for a player to insert bills. Further, the coin exit 15 is a portion for paying out coins or medals corresponding to accumulated credits when a player makes a payout operation.

The panel portion 3 constituting the gaming machine 1 includes a front display 21, speakers 22, and LEDs 23. The front display 21 is a display device that displays an image in accordance with the progress of the game. Specifically, the front display 21 displays images such as an image of a dealer distributing cards or exchanging chips. The front display 21 also displays the fronts of distributed cards. The speakers 22 output music and/or sound effects in accordance with the progress of the game. These speakers 22 are set up at the upper portion of the front display 21. The LEDs 23 are a light emitting device that is lit at the time of various effects, and enhances the sense of reality of the game by emitting light in various modes for the effects.

Next, the structure according to a control system of the gaming machine 1 will be described in detail with reference to an accompanying drawing.

Figure 5:
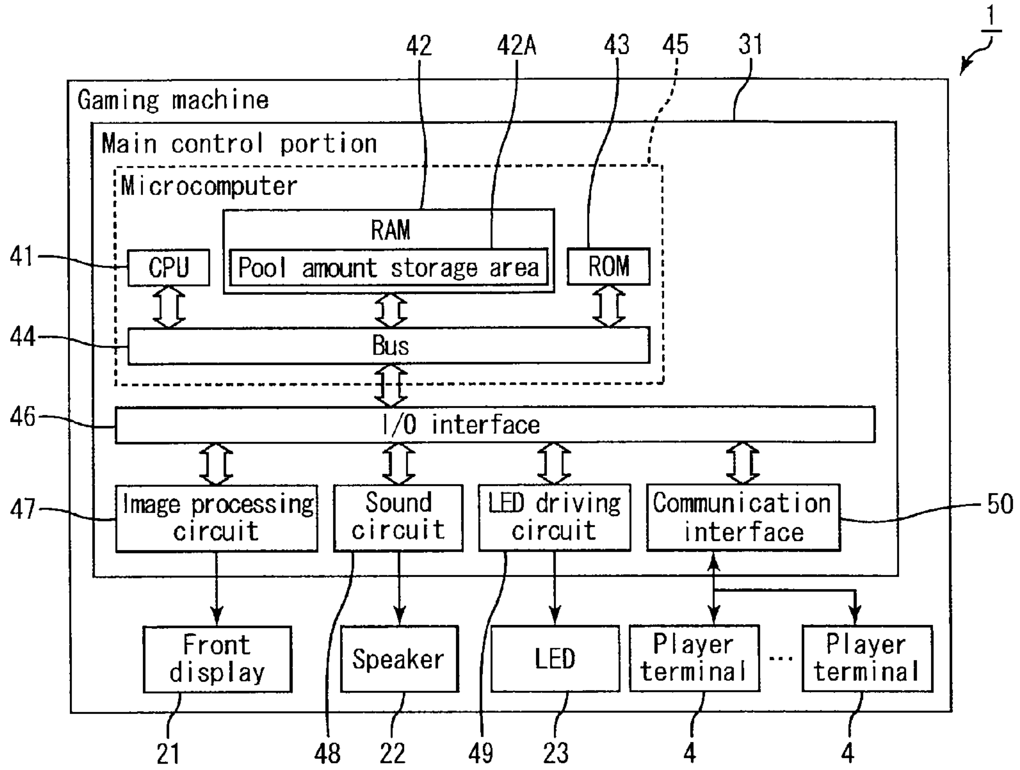
FIG. 5 is a block diagram schematically illustrating a control system of the gaming machine according to one embodiment of the present invention.

FIG. 5 is a block diagram schematically illustrating a control system of the gaming machine according to one embodiment of the present invention.

As illustrated in FIG. 5, the gaming machine 1 includes a main control portion 31, the plurality of player terminals 4 connected to the main control portion 31, and a variety of peripheral devices.

The main control portion 31 basically includes a microcomputer 45 as a core. This microcomputer 45 includes a CPU 41, a RAM 42, a ROM 43, and a bus 44 for transmitting data among the CPU 41, the RAM 42 and the ROM 43. The ROM 43 stores various programs necessary for executing processing to control the gaming machine 1, and data tables. The CPU 41 is a calculating unit that executes various control programs. The CPU 41 is primarily responsible in control of the respective driving circuits by the microcomputer 45. The RAM 42 is a memory for temporarily storing a variety of data calculated by the CPU 41. The ROM 43 stores image data of the fronts and the backs of cards used as the player cards and the dealer cards.

The CPU 41 is also connected through an I/O interface 46 to an image processing circuit 47, a sound circuit 48, an LED driving circuit 49, and a communication interface 50. The image processing circuit 47 is a circuit for controlling a display mode of the front display 21, based on control by the CPU 41. Therefore, performing a display control of the front display 21 through the image processing circuit 47 displays images such as a dealer image 102 on the front display 21 (see FIG. 8). The sound circuit 48 is a circuit for performing a drive control of the speakers 22, based on control by the CPU 41. In other words, controlling the speakers 22 through the sound circuit 48 outputs the music and sound effects according to the progress of the game. The LED driving circuit 49 is a circuit for controlling illumination modes of the LEDs 23. Therefore, controlling the illumination modes of the LEDs 23 through the LED driving circuit 49 enables production of effects corresponding to the progress of the game.

The communication interface 50 is an interface that allows each player terminal 4 to transmit and receive various data to and from a main control portion 31. Therefore, a variety of information such as betting operation information from each player terminal 4 is transmitted and received to and from the main control portion 31 through the communication interface 50.

Next, the control system of the player terminals 4 according to the present embodiment will be described in detail with reference to an accompanying drawing.

Figure 6:
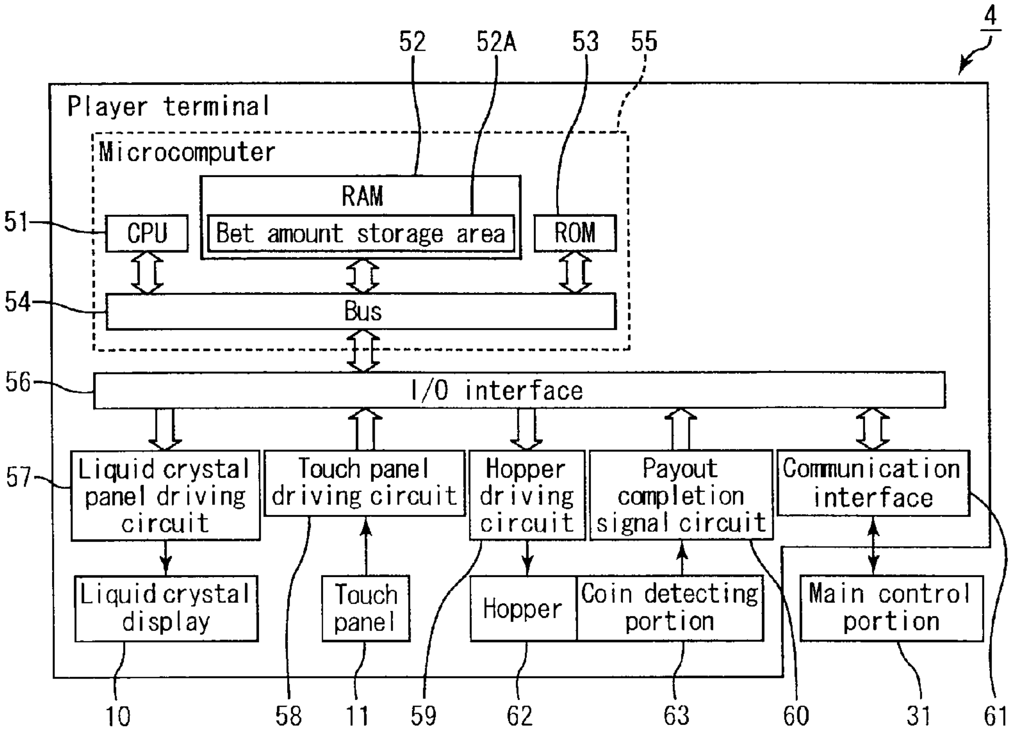
FIG. 6 is a block diagram schematically illustrating a control system of each player terminal according to one embodiment of the present invention.

FIG. 6 is a block diagram schematically illustrating the control system of each player terminal 4 according to one embodiment of the present invention.

As illustrated in FIG. 6, each player terminal 4 according to the present embodiment includes a microcomputer 55 as a core. The microcomputer 55 includes a CPU 51, a RAM 52, a ROM 53, and a bus 54 for transmitting data among the CPU 51, the RAM 52, the ROM 53. The ROM 53 stores various programs necessary for executing processing to control the player terminal 4, and data tables. In the first embodiment, the ROM 53 stores side-game payout table data. The side-game payout table data shows relationships between the results of the side game and the amounts of additional payouts (side-game payout table, see FIG. 2).

The CPU 51 is a calculating unit that executes a variety of control programs stored in the ROM 53. The CPU 51 is primarily responsible in control of the respective driving circuit by the microcomputer 55. The RAM 52 is a memory for temporarily storing a variety of data calculated by the CPU 51. The RAM 52 has a bet amount storage area 52A provided therein. The bet amount storage area 52A stores a credit amount currently accumulated in the player terminal 4, a bet target betted by a player (i.e., normal bet or side bet), and the bet amount (credit amount) betted on the bet target.

The CPU 51 is connected through an I/O interface 56 to a liquid crystal panel driving circuit 57, a touch panel driving circuit 58, a hopper driving circuit 59, a payout completion signal circuit 60, and a communication interface 61. The liquid crystal panel driving circuit 57 is connected to the liquid crystal display 10, and is used for controlling display modes of the liquid crystal display 10. The touch panel driving circuit 58 is connected to the touch panel 11, detects the operation of the touch panel 11 by a player, and is used for providing control that corresponds to the operation. The hopper driving circuit 59 is connected to a hopper 62, and is used for controlling the hopper 62 at the time of paying out coins to the coin exit 15. The payout completion signal circuit 60 is connected to a coin detecting portion 63. Upon payout of a predetermined number of coins to the coin exit 15, the payout completion signal circuit 60 transmits a payout completion signal indicating that payout has completed.

The communication interface 61 is an interface that allows the player terminal 4 to transmit and receive a variety of information to and from the main control portion 31. For example, betting information based on operation information outputted from the touch panel 11 is transmitted to the main control portion 31 through the communication interface 61.

Next, with reference to the accompanying drawings, a detailed description will be given with respect to the game screen 70 displayed on the liquid crystal display 10 of the player terminal 4 when the Blackjack game is executed in the gaming machine 1 according to the present embodiment.

FIG. 7 is an explanatory view illustrating a game screen displayed on the liquid crystal display of the player terminal.

In this context, in the gaming machine 1 according to the present embodiment, the player makes a betting operation by using the game screen 70 and the touch panel 11. This betting operation is an operation of betting or side-betting a predetermined amount of credits to a current game. Similarly, by using the game screen 70 and the touch panel 11, the player can make an operation for requesting the player additional card or an operation of increasing the bet amount.

As shown in FIG. 7, the game screen 70 includes a player's card display area 71, a display area 300 of compared-attribute selection buttons, a game-result display area 305, and an information display area for displaying various operating buttons and player's information.

The player's card display area 71 is an area for displaying the cards distributed to the player in a Blackjack game (see FIG. 1A).

The number selection button images 301 (number selection button images 301*a* to 301*m*) and the suit selection button images 302 (suit selection button image 302*a* to 302*d*) and the set button image 303 displayed in the display area 300 of compared-attribute selection buttons (see FIG. 1B).

The side-game-result image 95 showing the result of the side game and the additional-payout image 304 are displayed in the game-result display area 305 (see FIG. 1D).

Various operating buttons including a bet amount button image 75, a Repeat bet button image 76, a normal bet button image 73, a side bet button image 86 and the like; and player information including a bet amount display area 90 are displayed in the information display area.

The player's card display area 71 displays the normal bet button image 73 in its lower portion.

In the case of placing a normal bet, the player selects a bet amount by touching the bet amount button described later, and then, sets the bet amount (normal bet amount) to the Blackjack game by touching the normal bet button. The bet amount determined by operating the bet amount button and the normal bet button is transmitted to the main control portion 31.

The side bet button image 86 is displayed to the left of the normal bet button image 73. In the case of placing a side bet, the player selects a bet amount by touching the bet amount button described later, and then, sets the bet amount (side bet amount) to a side game by touching the side bet button. The bet amount determined by operating the bet amount button and the side bet button is transmitted to the main control portion 31.

In addition, to the lower right hand side of the normal bet button image 73, a plurality of bet amount button images 75 (three button images of "1 credit", "10 credits", and "100 credits" in the present embodiment) are displayed. The player can set the bet amount to be betted as a normal bet to the current Blackjack game and the bet amount to be betted as a side bet in the side game by touching a position on the touch panel 11 corresponding to any of the BET amount button images 75.

Above the BET amount button images 75, a Repeat bet button image 76 and an UNDO bet button image 77 are displayed. The player can bet a bet amount equal to that of the previous game by touching the Repeat bet button. In addition, the player can cancel the betting operation that has already been made, by touching the UNDO bet button.

Below the normal bet button image 73 and the side bet button image 86, a plurality of operating button images are displayed. These operating button images are used by the player to carry out the underlying strategy with the dealer. Specifically, as operating button images, a STAND button image 78, a HIT button image 79, a SURRENDER button image 80, an INSURRANCE button image 81, a SPLIT button image 82, and a Double Down button image 83 are arranged.

The STAND button 78 is operated at the time of playing a game against the dealer with cards currently distributed without requesting distribution of additional cards. The HIT button 79 is operated when an additional card is newly requested in addition to the currently distributed cards, namely, when a player additional card is requested. The HIT button 79 can be used until a total of the numbers displayed on the distributed cards is equal to or greater than "21".

The SURRENDER button 80 is operated at the time of withdrawal from the current game. When the SURENDER button 80 is operated, half of the normal bet amount at that time is collected, and the remaining normal bet amount is returned to the player. The INSURANCE button 81 is operated when the player applies insurance for a case in which cards distributed to the dealer makes a hand of Blackjack.

The SPLIT button 82 is operated in the case where numbers displayed on two cards distributed in the game are the same, and the cards are divided into two hands. When the SPLIT button 82 is operated, the player can play a game against the dealer by two or more hands. The Double Down button 83 is operated in the case where the player doubles the normal bet amount in the game. When the Double Down button 83 is operated, the player receives a player additional card to play a game against the dealer.

In addition, below the STAND button image 78, a HELP button image 84 is displayed. The HELP button 84 is operated to display an operating method of the gaming machine 1 on the liquid crystal display 10. In addition, on the right side of the HELP button image 84, a message area 85 is arranged. A message supporting the progress of the game is displayed in this message area 85.

On the lower portion of the game screen 70, a normal bet amount display area 90, an acquired amount display area 91, an owned credit display area 92, a bet amount lower limit display area 93, a bet amount upper limit display area 94, and a side bet amount display area 97 are arranged. A normal bet amount betted by the player to the current Blackjack game is displayed in the normal bet amount display area 90. The credit amount acquired as an award by the player is displayed in the acquired amount display area 91. Then, a credit amount currently owned by the player is displayed in the owned credit display area 92. A lower limit of the bet amount that can be betted by the player is indicated in the bet amount lower limit display area 93, and an upper limit of the bet amount that can be betted by the player is indicated in the bet amount upper limit display area 94. A side bet amount that is side-betted by the player to the current game is displayed in the side bet amount display area 97.

In addition, on the left side of the player card display area 71, a game-result display area 305 is arranged. An image indicating winning and losing between the player and the dealer in the Blackjack game is displayed in the game-result display area 305. For example, in the case where the player has won, characters "YOU WON" are displayed in the game-result display area 305. In the game-result display area 305, characters "YOU LOST" are displayed in the case where the player has lost, and characters "DRAW" are displayed in the case where the game has been drawn. In addition, in the game-result display area 305, an image indicating the result of the side game is displayed. As described with reference to FIG. 1, a predetermined image such as "PERFECT NUMBER!!" is displayed in the game-result display area 305 when the result of the executed side game was a predetermined result.

Next, with reference to the accompanying drawings, a detailed description will be given with respect to a main screen 101 displayed on the front display 21 when a Blackjack game is played in the gaming machine 1 according to the present embodiment.

Figure 8:
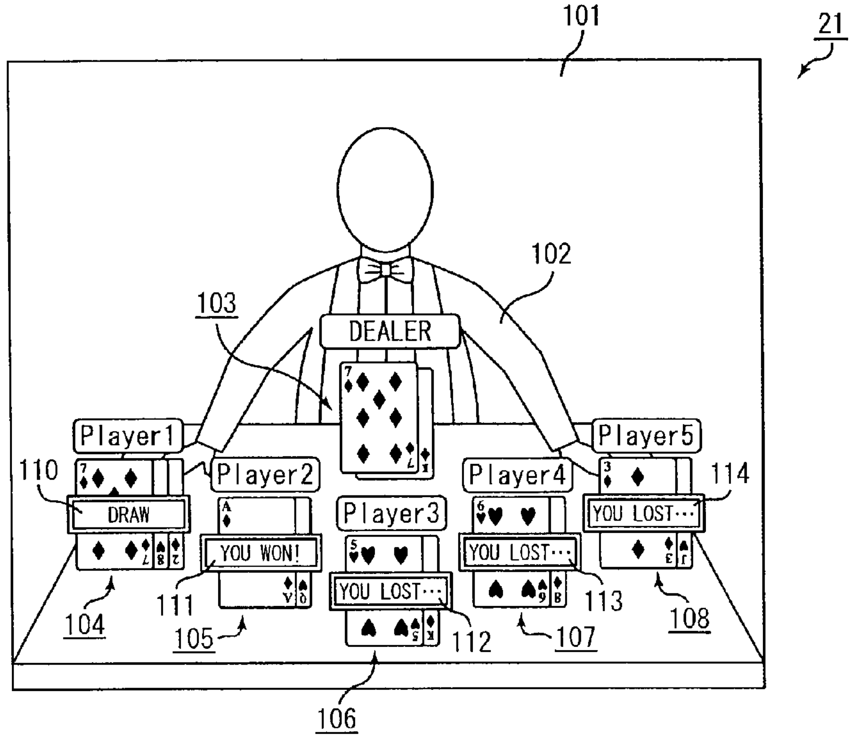
FIG. 8 is an explanatory view of a main screen displayed on a front display.

FIG. 8 is an explanatory view of the main screen displayed on the front display.

In the gaming machine 1 according to the present embodiment, on the main screen 101, various images are displayed together with the progress of the game. Specifically, a dealer image 102 is displayed on the main screen 101, and the dealer who carries out card distribution or the like is expressed by an animation. By displaying such main screen 101, the gaming machine 1 gives the sense of reality to the player of the game.

In addition, on the substantially center portion of the main screen 101, dealer cards 103 are displayed. The dealer cards 103 indicate the cards distributed to the dealer. Further, on the lower portion of the main screen 101, player cards 104 to 108 indicating the player cards of respective players (a maximum of 5 players) who play the game at the player terminals 4 and the winning and losing result images 110 to 114 indicating winning and losing between each of the players and the dealer are displayed. Therefore, the player can know types of cards distributed to the dealer and types of cards distributed to the other players who play the game at the same time by referring to the main screen 101. Further, the player can know the result of winning and losing of the other players together with the result of one's own winning and losing by referring to the main screen 101.

Next, with reference to the accompanying drawings, a detailed description will be given with respect to a game processing program executed by the CPU 41 of the main control portion 31, and a game processing program at the player terminal side executed by the CPU 51 of the player terminal 4 in the gaming machine 1 having the above construction according to the present embodiment.

First, with reference to FIG. 9 to FIG. 10, the game processing program executed by the main control portion 31 will be described.

When the main control portion 31 starts the game processing program, the CPU 41 first transmits a normal bet period start instruction to each player terminal 4 (step S1). This normal bet period start instruction is an instruction for starting acceptance of a normal bet operation by the player at each player terminal 4.

After that, when the current step proceeds to step S2, the CPU 41 receives a normal bet information transmitted from each player terminal 4. In this context, the normal bet information includes information relating to the normal bet amount (credit amount) betted by the player. Upon the reception of the normal bet information, the CPU 41 stores the normal bet information in the RAM 42 in association with each player terminal 4, and then, shifts the processing to step S3.

After that, the CPU 41 carries out a player initial card lottery processing (step S3). The player initial card lottery processing (step S3) is a processing for determining cards associated with each player and dealer by means of lottery. In this context, in the Blackjack game, six decks or eight decks of playing cards are used. One deck has 52 cards assigned with the numbers and suits described above. Therefore, in the player initial card lottery processing (step S3), the CPU 41 randomly associates any of numbers from 1 to N (distribution order) with N cards (for example, N=312 in the case where six decks of cards are used) used in one game. The CPU 41 associates cards with the dealer and the player based on the thus-determined distribution order (in other words, the dealer cards are distributed to the dealer and the player initial cards or the player additional card are distributed to the player).

Following the player initial card lottery processing (step S3), in step S4, the CPU 41 transmits player initial card information to the player terminal 4 that has transmitted the normal bet information, based on a lottery result of the player initial card lottery processing (step S3). In this context, the player initial card information is information relating to two cards to be first distributed to each player who participates in the Blackjack game. Namely, the player initial card information includes information indicating numbers and suits of two cards to be first distributed (such as "Heart 7", "Spade A", for example).

After the player initial card information has been transmitted to the player terminal 4 at which the normal bet operation has been made, the CPU 41 executes a dealer's image effect processing (step S5). Specifically, the CPU 41 controls the front display 21 and carries out an effect of displaying an image of the dealer who distributes two cards respectively to the player and the dealer on the main screen 101 (refer to FIG. 8). The number and suit of the second card distributed to the dealer are not displayed at the time when the card is distributed.

Next, the CPU 41 executes selection-information reception processing (step S6). The selection-information reception processing is specifically described later with reference to FIG. 14.

In the following step S7, the CPU 41 receives card determination information transmitted from each player terminal 4. The card determination information is information to be transmitted in the case where the player has selected the game against the dealer with the cards currently distributed. Therefore, the card determination information is transmitted to the main control portion 31 by way of selection of the STAND button 78 or the Double Down button 83 at the player terminal 4.

Upon reception of the card determination information, the CPU 41 determines whether or not the total of the numbers displayed on the cards distributed to the dealer is "17" or greater (step S8).

When determining the total of the numbers is smaller than "17", the CPU 41 determines a card to be distributed to the dealer and displays the determined card on the front display 21 (step S9). Then, the CPU 41 shifts the processing to step S8.

When determining the total of the number is "17" or greater, the CPU 41 compares the cards distributed to the dealer (dealer cards) with the cards distributed to each player (player cards), and judges winning and losing between each player and the dealer (step S10). Specifically, the total of the numbers displayed on the dealer cards and the total of the numbers displayed on the player cards are calculated, and the one having the cards with the total of numbers closer to "21" without exceeding "21" is determined to be a winner. In the case where the total of numbers of the player cards and the total of numbers of the dealer cards are the same, the CPU 41 judges the game to be a draw.

Then, when the current step proceeds to step S11, the CPU 41 transmits a result of a winning, and losing judgment processing (step S10) to each player terminal 4. After that, as shown in FIG. 8, the CPU 41 displays winning and losing result images 110 to 114 indicating the result of winning and losing judgment of each player terminal 4 on the main screen 101 of the front display 21 (step S12). After displaying the result of the winning and losing judgment processing (step S12), the CPU 41 completes the game processing program in the main control portion 31.

Next, the game processing program executed at the side of the player terminal 4 will be described with reference to FIG. 9 and FIG. 10.

When execution of the game processing program is started, in step S101, the CPU 51 receives the normal bet period start instruction from the main control portion 31.

After that, when the current step proceeds to step S102, the CPU 51 displays the game screen 70 (see FIG. 7) on the liquid crystal display 10, and starts acceptance of a normal bet operation. In this manner, at the player terminal 4, the player can make a normal bet operation (bet to a Blackjack game). In the case where a normal bet operation has been made, the CPU 51 specifies a normal bet amount (credit amount) based on the operational information from the bet amount button 75 and the normal bet button 73. Then, after the specified normal bet amount has been stored as the normal bet information in the RAM 52, the CPU 51 shifts the processing to step S103.

In step S103, the CPU 51 judges whether or not a normal bet period has terminated. Specifically, the CPU 51 makes judgment as to whether or not a predetermined given time (20 seconds, for example) has been passed after starting acceptance of the normal bet operation (i.e., reception of the normal bet period start instruction). In the case where the normal bet period has terminated (step S103: YES), the CPU 51 shifts the processing to step S104. On the other hand, in the case where the betting period has not terminated yet (step S103: NO), the CPU 51 continuously accepts the betting operation.

When the current step proceeds to step S104, the CPU 51 stores the current normal bet information in the RAM 52, and transmits the normal bet information to the main control portion 31. The normal bet information includes information relating to the normal bet amount (credit amount) betted by the player.

Then, in step S105, the CPU 51 receives the player initial card information. The received player initial card information is information to be transmitted from the main control portion 31 to the player terminal 4 in step S6. Further, the player initial card information is information on two cards associated with the player who plays the game at the player terminal 4. Therefore, the player initial card information includes information on numbers and suits of two player initial cards (such as "Heart 7", "Spade A", for example). Upon the reception of the player initial card information, the CPU 51 displays the player initial cards in a player card display area 71 of the game screen 70, based on the player initial card information (step S106).

Then, the CPU 51 executes selection-input acceptance processing (step S107). The selection-input acceptance processing is specifically described later with reference to FIG. 11.

After the processing of step S107, the CPU 51 transmits card determination information to the main control portion 31.

Next, when the current step proceeds to step S109, the CPU 51 receives the result of winning and losing judgment transmitted from the main control portion 31 in step S11. After that, the CPU 51 displays the result of winning and losing judgment at the player terminal 4 on the liquid crystal display 10, based on the received result of winning and losing judgment (step S110). Specifically, in the case where the game result is a draw, the CPU 51 displays characters "DRAW" in the game-result display area 305 of the game screen 70. Similarly, the CPU 51 displays characters "YOU WON" in the case where the player has won the game, and displays characters "YOU LOST" in the case where the player has lost the game.

After displaying the winning and losing judgment result on the liquid crystal display 10, the CPU 51 executes the payout processing (step S111). In this payout processing (step S111), the CPU 51 carries out an adding operation of credits or payout of coins, based on the result of winning and losing judgment (result of normal game) and the result of the side game (see FIG. 2). In other words, in the case where the side game has not been played, the CPU 51 carries out the adding operation of credits or payout of coins, only based on the result of winning and losing judgment. On the other hand, in the case where the side game has been played, the CPU 51 executes the adding operation of credits or payout of coins, based on the result of winning and losing judgment and the result of the side game.

Subsequently, the selection-input acceptance processing (see step S107 of FIG. 10) is described with reference to FIG. 11.

Figure 11:
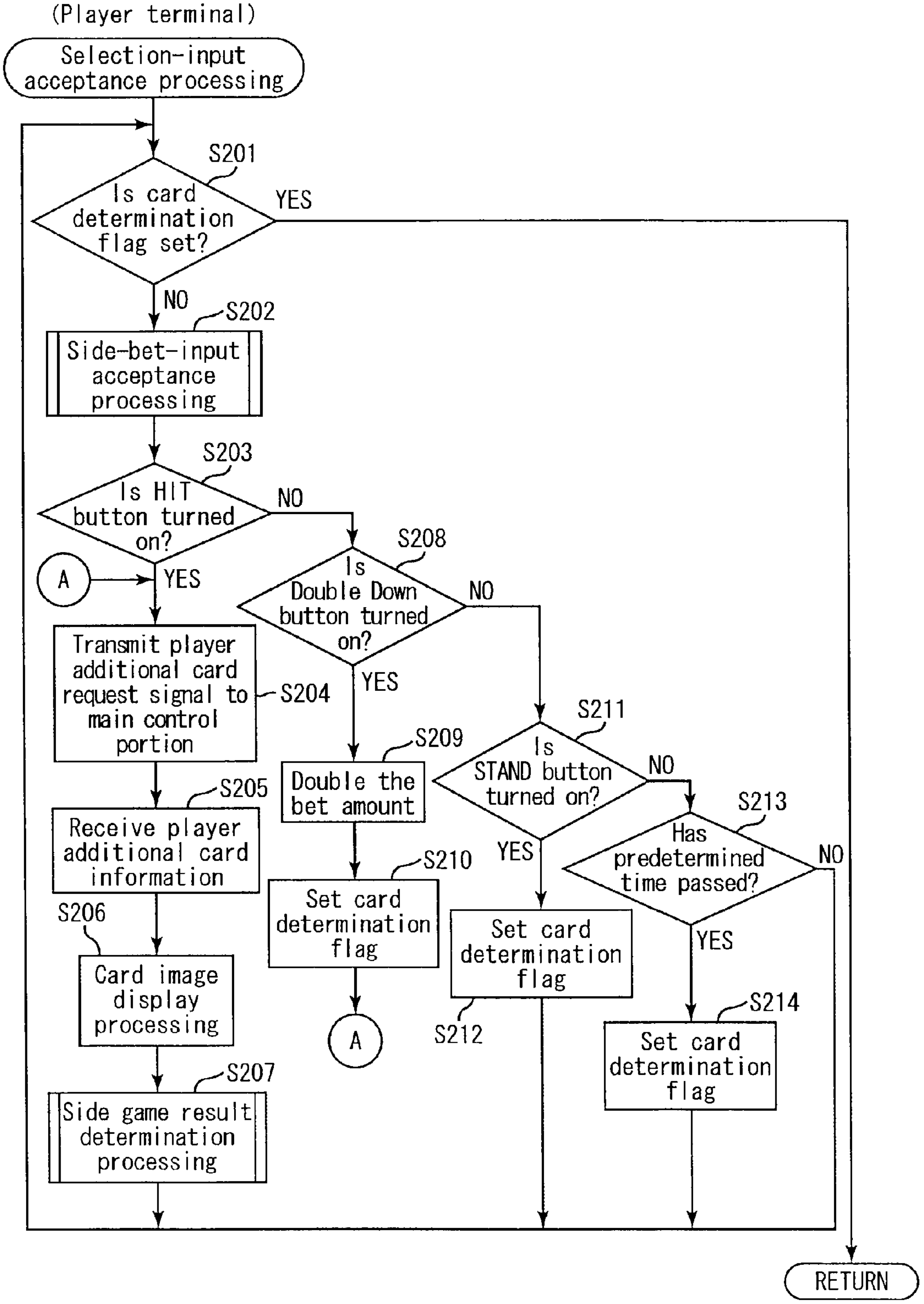
FIG. 11 is a flowchart illustrating a subroutine of selection-input acceptance processing executed in each player terminal.

FIG. 11 is a flowchart illustrating a subroutine of selection-input acceptance processing executed in each player terminal.

First, the CPU 51 determines whether or not a card determination flag is set in the RAM 52 (step S201). The card determination flag is a flag to be set when the STAND button 78 or the Double Down button 83 is turned on (see step S210 and step S212). Namely, the card determination flag is set when the player makes an input for determining the player cards. It is to be noted that the card determination flag is to be cleared when the current Blackjack game ends (after the processing of step S111 of FIG. 10).

When determining that the card determination flag is set, the CPU 51 completes the present subroutine.

On the other hand, when determining that the card determination flag is not yet set, the CPU 51 executes the side-bet-input acceptance processing (step S202). The side-bet-input acceptance processing is described later with reference to FIG. 12.

Next, the CPU 51 determined whether or not the HIT button is turned on (step S203).

In this processing, the CPU 51 determines whether or not it has received a signal to be transmitted from the touch panel 11 when the position on the touch panel 11 corresponding to the HIT button image 79 has been touched.

When determining that the HIT button is turned on, the CPU 51 transmits a player additional card request signal to the main control portion 31 (step S204). Upon the reception of the player additional card request signal, the main control portion 31 determines a player additional card (see FIG. 14).

Next, the CPU 51 receives player additional card information from the main control portion 31 (step S205). The player additional card information indicates the player additional card.

Then, the CPU 51 executes card image display processing (step S206). In this processing, the CPU 51 displays the player additional card indicated by the received player additional card information in the player card display area 71 of the liquid crystal display 10 (see FIG. 1A).

Subsequently, the CPU 51 executes side game result determination processing (step S207). The side game result determination processing is specifically described later with reference to FIG. 13.

After the processing of step S207, the CPU 51 shifts the processing to step S201.

When determining that the HIT button is not turned on in step S203, the CPU 51 determines whether or not the Double Down button is turned on (step S208). In this processing, the CPU 51 determines whether or not it has received a signal to be transmitted from the touch panel 11 when the position on the touch panel 11 corresponding to the Double Down button image 83 has been touched.

When determining the Double Down button is turned on, the CPU 51 doubles the normal bet amount (step S209). In this processing, the CPU 51 subtracts the credit amount corresponding to the normal bet amount stored in the RAM 52 from the credit amount stored in the RAM 52. In addition, the CPU 51 stores the amount obtained by doubling the normal bet amount stored in the RAM 52 as a new normal bet amount in the RAM 52.

In the present embodiment, there has been described a case where the normal bet amount is doubled when "Double Down" is selected. However, in the present invention, the increment of the normal bet amount when the special additional command is inputted is not particularly limited. For example, the normal bet amount may be trebled.

Next, the CPU 51 sets the card determination flag in the RAM 52 (step S210).

After the processing of step S210, the CPU 51 shifts the processing to step S204. As a result, the player additional card is distributed to the player.

When determining that the Double Down button has not been turned on in step S208, the CPU 51 determines whether or not the STAND button is turned on (step S211). In this processing, the CPU 51 determines whether or not it has received a signal to be transmitted from the touch panel 11 when the position on the touch panel 11 corresponding to the STAND button image 78 has been touched.

When determining that the STAND button has been turned on, the CPU 51 sets the card determination flag in the RAM 52 (step S212).

Then, the CPU 51 shifts the processing to step S201.

When determining that the STAND button has not been turned on in step S211, the CPU 51 determines whether or not a predetermined given time has passed after the card image display processing (step S206) is executed (step S213).

When determining that the predetermined given time has passed, the CPU 51 sets the card determination flag in the RAM 52 (step S213).

When determining that the predetermined given time has not passed yet in step S213 or after the processing of step S214, the CPU 51 shifts the processing to step S201.

As above, the selection-input acceptance processing (see step S107 of FIG. 10) has been described with reference to FIG. 11.

Subsequently, the side-bet-input acceptance processing (see step S202 of FIG. 11) is described with reference to FIG. 12.

Figure 12:
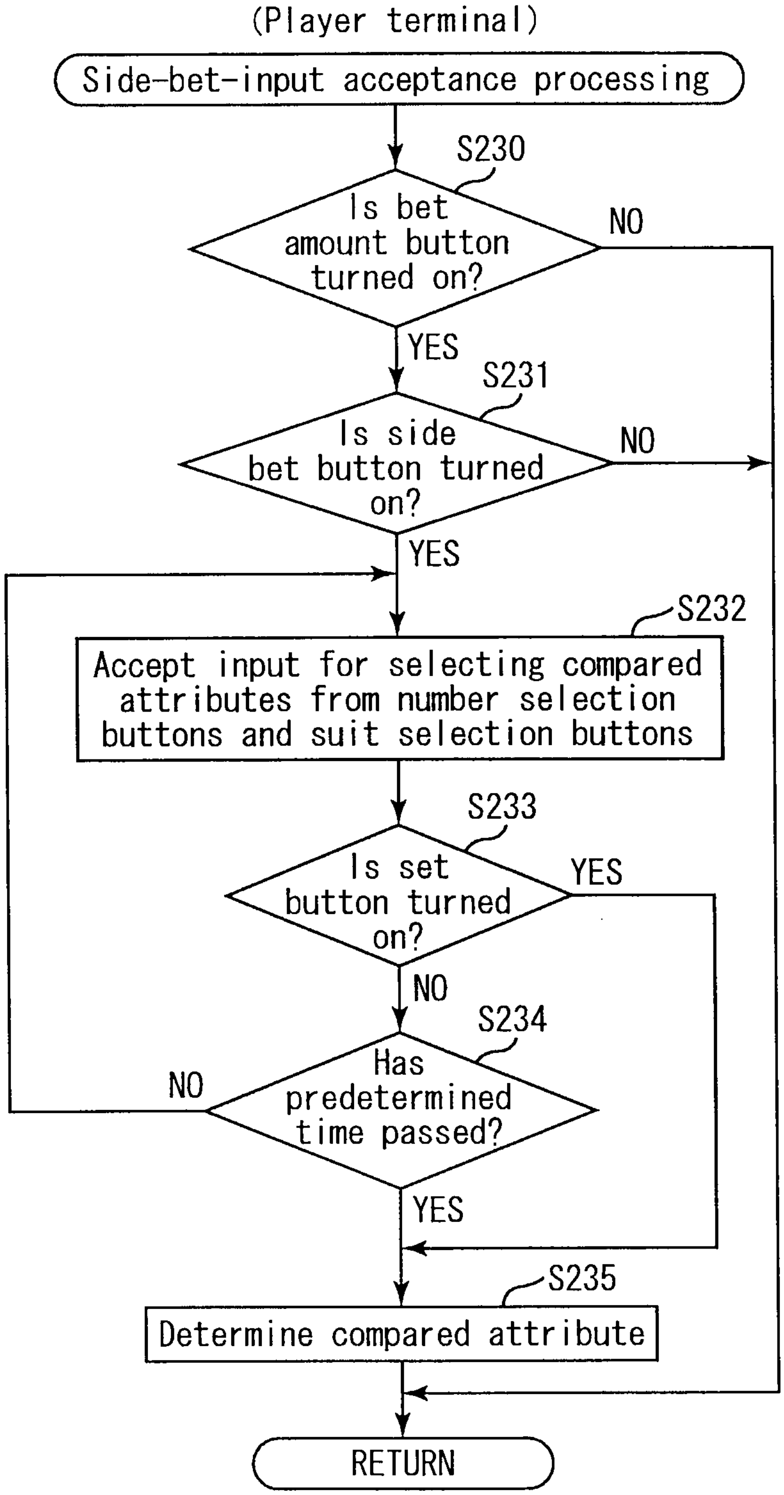
FIG. 12 is a flowchart illustrating a subroutine of side-bet-input acceptance processing executed in each player terminal.

FIG. 12 is a flowchart illustrating a subroutine of side-bet-input acceptance processing executed in each player terminal.

First, the CPU 51 determines whether or not the bet amount button has been turned on (step S230). In this processing, the CPU 51 determines whether or not it has received a signal to be transmitted from the touch panel 11 when the position on the touch panel 11 corresponding to the bet amount button image 75 has been touched.

When determining the bet amount button has not been turned on, the CPU 51 completes the present subroutine.

On the other hand, when determining that the bet amount button has been turned on, the CPU 51 subtracts the credit amount stored in the RAM 52 in accordance with the bet amount button that has been turned on and stores the side bet amount in the RAM 52.

Then, the CPU 51 determines whether or not the side bet button has been turned on (step S231). In this processing, the CPU 51 determines whether or not it has received a signal to be transmitted from the touch panel 11 when the position on the touch panel 11 corresponding to the side bet button image 86 has been touched.

When determining the side bet button has not been turned on, the CPU 51 completes the present subroutine.

On the other hand, when determining that the side bet button has been turned on, the CPU 51 sets the side bet flag in the RAM 52. It is to be noted that the side bet flag is cleared when the current Blackjack game ends (after the processing of step S111 of FIG. 10).

Then, the CPU 51 accepts an input for selecting the compared attributes from number selection buttons and the suit selection buttons (step S232).

In this processing, the CPU 51 determines whether or not it has received a signal to be transmitted from the touch panel 11 when the position on the touch panel 11 corresponding to any of the number selection button images 301 has been touched. When determining that it has received the signal, the CPU 51 stores the number corresponding to the number selection button that has been turned on in the RAM 52.

In addition, the CPU 51 determines whether or not it has received a signal to be transmitted from the touch panel 11 when the position on the touch panel 11 corresponding to any of the suit selection button images 302 has been touched. When determining that it has received the signal, the CPU 51 stores the suit corresponding to the suit selection button that has been turned on in the RAM 52.

Next, the CPU 51 determines whether or not the set button is turned on (step S233). In this processing, the CPU 51 determines whether or not it has received a signal to be transmitted from the touch panel 11 when the position on the touch panel 11 corresponding to the set button image 303 has been touched.

When determining that the set button has not been turned on, the CPU 51 determines whether or not a predetermined given time has passed (step S234). When determining that the predetermined given time has not passed, the CPU 51 returns the processing to step S232.

When determining that the predetermined given time has passed or when determining that the set button has been turned on in step S233, the CPU 51 determines the number and/or the suit stored in the RAM 52 in step S232 as the compared attributes (step S235).

After that, the CPU 51 completes the present subroutine.

As above, the side-bet-input acceptance processing (see step S202 of FIG. 11) has been described with reference to FIG. 12.

Subsequently, the side game result determination processing (see step S207 of FIG. 11) is described with reference to FIG. 13.

Figure 13:
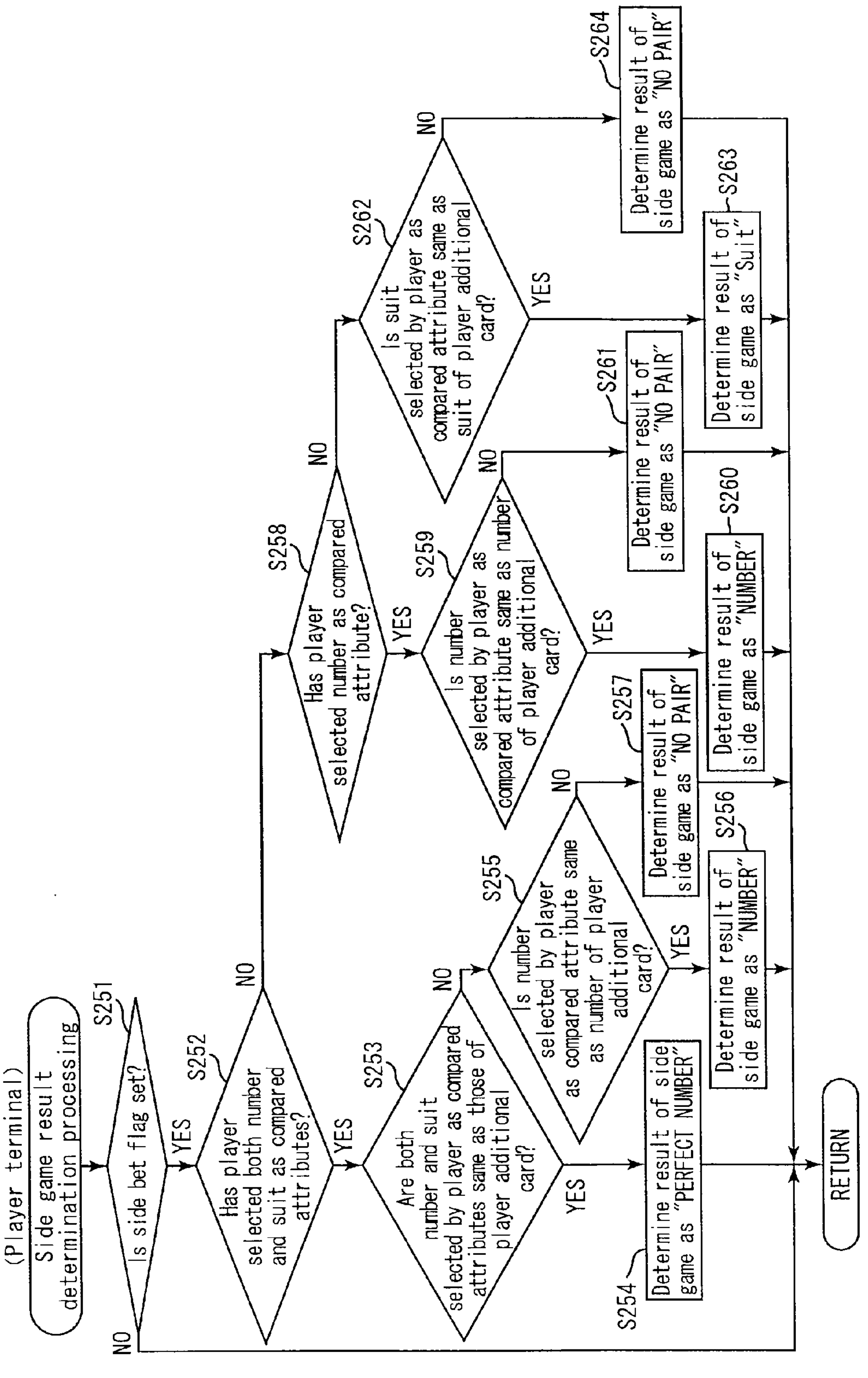
FIG. 13 is a flowchart illustrating a subroutine of side game result determination processing executed in each player terminal.

FIG. 13 is a flowchart illustrating a subroutine of side game result determination processing executed in each player terminal.

First, the CPU 51 determines whether or not the side bet flag is set in the RAM 52 (step S251).

When determining that the side bet flag is not set, the CPU 51 completes the present subroutine.

On the other hand, when determining the side bet flag is set, the CPU 51 determines whether or not the compared attributes selected by the player are both the number and the suit (step S252). In this processing, the CPU 51 determines whether or not the attributes determined as the compared attributes in step S235 are both the number and the suit.

When determining the compared attributes selected by the player are both the number and the suit, the CPU 51 determines whether or not both the number and the suit selected by the player are same as the number and the suit drawn on the player additional card displayed in step S206 of FIG. 11 (step S253).

When determining both the number and the suit selected by the player are same as the number and the suit drawn on the player additional card, the CPU 51 determines the result of the side game as "PERFECT NUMBER" (step S254).

In this processing, the CPU 51 displays an image corresponding to characters "PERFECT NUMBER" as the side-game-result image 95 in the game result display area 305 of the liquid crystal display 10. In addition, the CPU 51 determines the additional payout amount based on the side-game payout table data stored in the ROM 53 and the side bet amount stored in the RAM 52 and displays the additional-payout image 304 corresponding to the determined additional payout amount in the game result display area 305 of the liquid crystal display 10.

After that, the CPU 51 completes the present subroutine.

When determining not both the number and the suit selected by the player are same as the number and the suit drawn on the player additional card, the CPU 51 determines whether or not the number selected by the player is same as the number drawn on the player additional card (step S255).

When determining the number selected by the player is same as the number drawn on the player additional card, the CPU 51 determines the result of the side game as "NUMBER" (step S256).

In this processing, the CPU 51 displays an image corresponding to characters "NUMBER" as the side-game-result image 95 in the game result display area 305 of the liquid crystal display 10. In addition, the CPU 51 determines the additional payout amount based on the side-game payout table data stored in the ROM 53 and the side bet amount stored in the RAM 52 and displays the additional-payout image 304 corresponding to the determined additional payout amount in the game result display area 305 of the liquid crystal display 10.

After that, the CPU 51 completes the present subroutine.

When determining the number selected by the player is not same as the number drawn on the player additional card in step S255, the CPU 51 determines the result of the side game as "NO PAIR" (step S257).

In this processing, the CPU 51 displays an image corresponding to characters "NO PAIR" as the side-game-result image 95 in the game result display area 305 of the liquid crystal display 10. In addition, the CPU 51 determines the additional payout amount as 0 based on the side-game payout table data stored in the ROM 53.

After that, the CPU 51 completes the present subroutine.

When determining that the compared attribute selected by the player is one of the number and the suit in step S252, the CPU 51 determines whether or not the compared attribute selected by the player is the number (step S258).

When determining that the compared attribute selected by the player is the number, the CPU 51 determines whether or not the number selected by the player is same as the number drawn on the player additional card displayed in step S206 of FIG. 11 (step S259).

When determining that the number selected by the player is same as the number drawn on the player additional card, the CPU 51 determines the result of the side game as "NUMBER" (step S260).

In this processing, the CPU 51 displays an image corresponding to characters "NUMBER" as the side-game-result image 95 in the game result display area 305 of the liquid crystal display 10. In addition, the CPU 51 determines the additional payout amount based on the side-game payout table data stored in the ROM 53 and the side bet amount stored in the RAM 52 and displays the additional-payout image 304 corresponding to the determined additional payout amount in the game result display area 305 of the liquid crystal display 10.

After that, the CPU 51 completes the present subroutine.

When determining that the number selected by the player is not same as the number drawn on the player additional card in step S259, the CPU 51 determines the result of the side game as "NO PAIR" (step S261).

In this processing, the CPU 51 displays an image corresponding to characters "NO PAIR" as the side-game-result image 95 in the game result display area 305 of the liquid crystal display 10. In addition, the CPU 51 determines the additional payout amount as 0 based on the side-game payout table data stored in the ROM 53.

After that, the CPU 51 completes the present subroutine.

When determining that the compared attribute selected by the player is not the number in step S258 (in this case, the compared attribute selected by the player is the suit), the CPU 51 determines whether or not the suit selected by the player is same as the suit drawn on the player additional card that is displayed in step S206 of FIG. 11 (step S262).

When determining the suit selected by the player is same as the suit drawn on the player additional card, the CPU 51 determines the result of the side game as "Suit" (step S263). In this processing, the CPU 51 displays an image corresponding to characters "Suit" as the side-game-result image 95 in the game result display area 305 of the liquid crystal display 10. In addition, the CPU 51 determines the additional payout amount based on the side-game payout table data stored in the ROM 53 and the side bet amount stored in the RAM 52 and displays the additional-payout image 304 corresponding to the determined additional payout amount in the game result display area 305 of the liquid crystal display 10.

After that, the CPU 51 completes the present subroutine.

When determining that the suit selected by the player is not same as the suit drawn on the player additional card instep S262, the CPU 51 determines the result of the side game as "NO PAIR" (step S264).

In this processing, the CPU 51 displays an image corresponding to characters "NO PAIR" as the side-game-result image 95 in the game result display area 305 of the liquid crystal display 10. In addition, the CPU 51 determines the additional payout amount as 0 based on the side-game payout table data stored in the ROM 53.

After that, the CPU 51 completes the present subroutine.

As above, the side game result determination processing (see step S207 of FIG. 11) has been described with reference to FIG. 13.

Next, selection-information reception processing (see step S6 of FIG. 10) is described with reference to FIG. 14.

Figure 14:
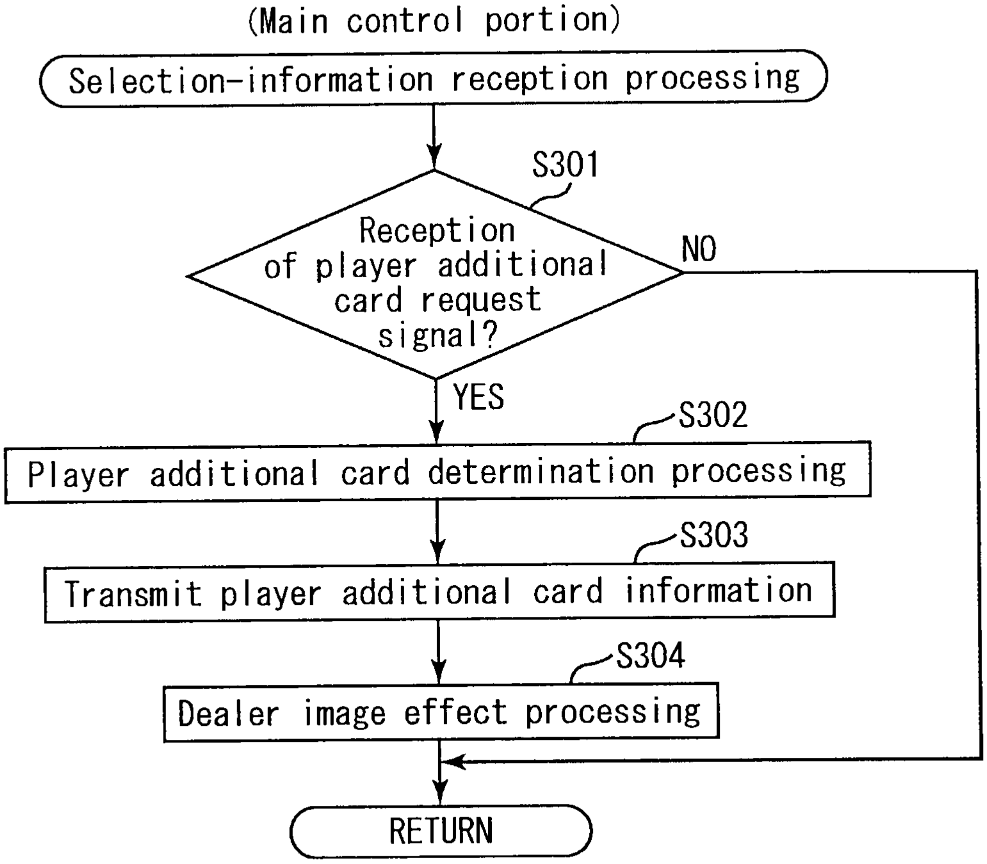
FIG. 14 is a flowchart illustrating a subroutine of selection-information reception processing executed in a main control portion.

FIG. 14 is a flowchart illustrating a subroutine of selection-information reception processing executed in a main control portion.

First, the CPU 41 determines whether or not it has received a player additional card request signal (see step S204 of FIG. 11) from the player terminal 4 (step S301).

When determining that it has not received the player additional card request signal, the CPU 41 completes the present subroutine.

Figure 9:
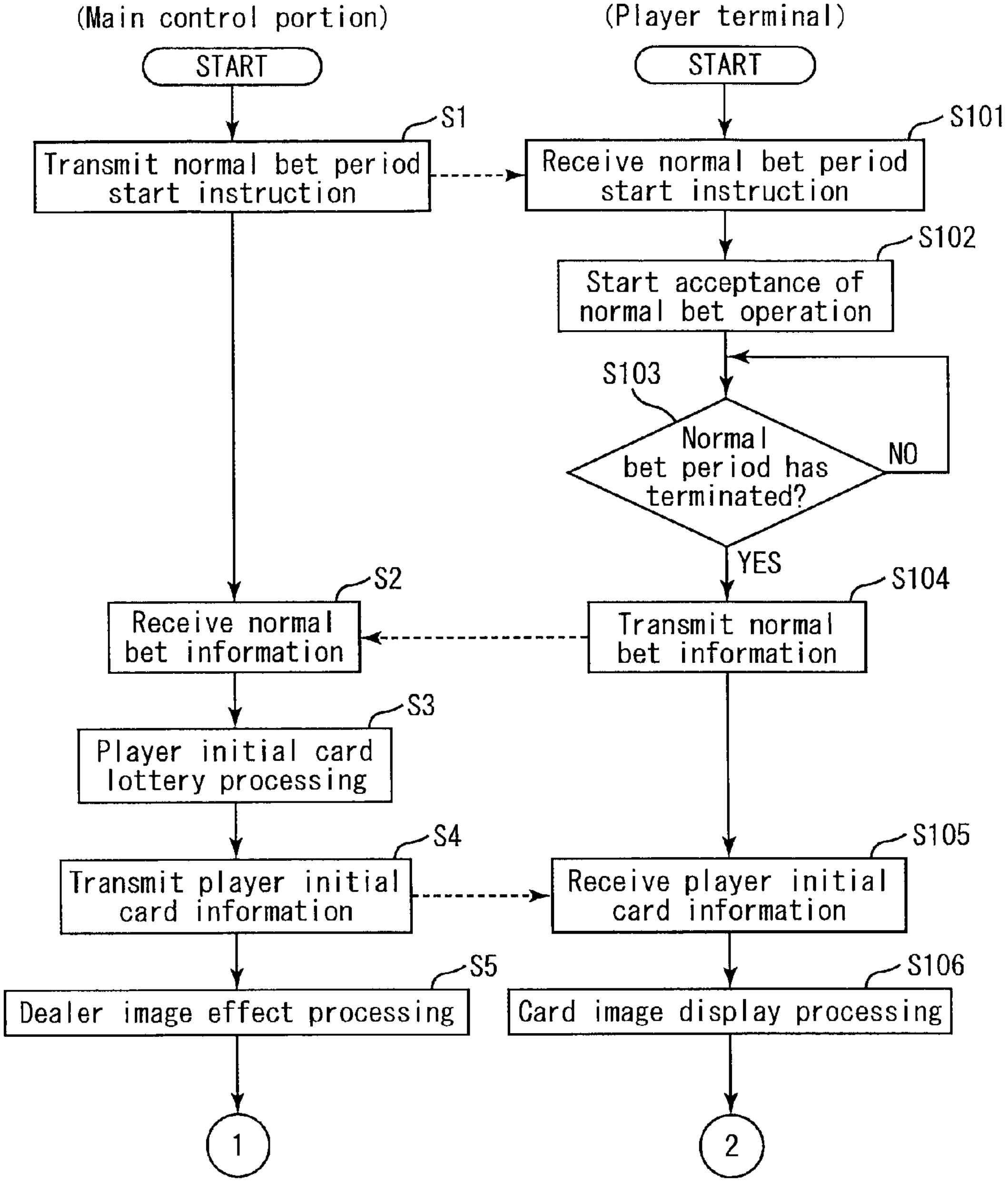
FIG. 9 is a flowchart of the game processing program of the gaming machine according to one embodiment of the present invention.
Figure 10:
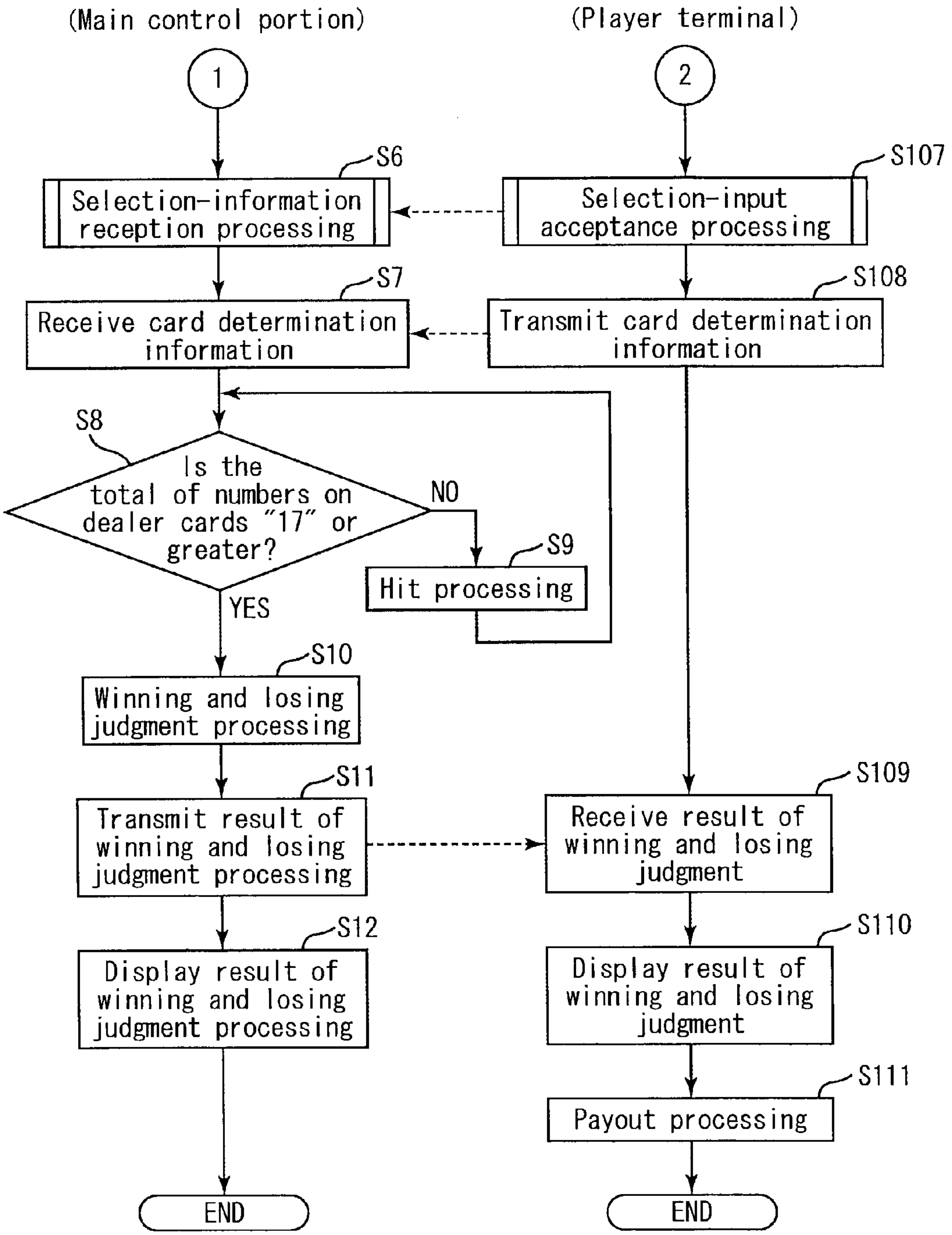
FIG. 10 is a flowchart of the game processing program of the gaming machine according to one embodiment of the present invention.

On the other hand, when determining that it has received the player additional card request signal, the CPU 41 determines the player additional card in accordance with the distribution order determined in step S3 of FIG. 9 (step S302).

Next, the CPU 41 transmits information indicative of the determined player additional card (player additional card information) to the player terminal 4 that has transmitted the player additional card request signal received in step S301 (step S303).

Then, the CPU 41 executes the dealer image effect processing (step S5 of FIG. 9) and completes the present subroutine.

As above, the first embodiment has been described with reference to FIG. 1 to FIG. 14.

According to the gaming machine 1 of the first embodiment and a playing method thereof, an input for selecting the compared attribute is accepted via the touch panel 11. Namely, the player can select the compared attribute by using the touch panel 11.

In the case where the side bet has been placed, whether or not the attribute of the player additional card is same as the compared attribute is determined so that the result of the side game is determined. The additional payout is offered based on the determined result of the side game.

Accordingly, the player additional card not only makes a difference in the result of the normal game, but also makes a difference in the result of the side game (namely, whether or not the player can win the additional payout). In this context, the player additional card is a significantly important card for the player.

Therefore, the player waits for the distribution of the player additional card after making a request for the distribution with a feeling of hope for a good player additional card.

As above, the gaming machine 1 of the first embodiment may increase the player's feeling of hope for a good player additional card, leading to a more interesting card game.

Further, according to the gaming machine 1 of the first embodiment, the player has a chance to select the compared attribute, and therefore, the player can predict the attribute of the player additional card through the selection of the compared attribute. Accordingly, the player can enjoy anticipating whether or not his or her prediction comes true. In addition, a player's own selection of the compared attribute may increase the player's fondness for the compared attribute. This also increases player's interest in the player additional card, leading to a further enhanced feeling of hope for a good player additional card.

Furthermore, according to the gaming machine 1 of the first embodiment, the number and/or the suit are selected as the compared attributes. When the number and the suit are selected as the compared attribute, the additional payout is offered in the case where the number determined as the compared attribute is same as the number allocated to the player additional card though the suit selected as the compared attribute is different from the suit allocated to the player additional card.

Accordingly, it is possible to please the player who may be disappointed because the number and the suit determined as the compared attributes are not completely same as the number and the suit allocated to the player additional card.

[Second Embodiment]

In the first embodiment, the case has been described where the compared attribute is any one of:

(i) a number and a suit;

(ii) a number; and (iii) a suit.

On the other hand, in the second embodiment, the compared attribute is "a combination of a number and a suit" (hereinafter, also referred to as a compared card). The number of compared cards is determined in accordance with the side bet amount.

FIG. 15 is a view illustrating relationships between side bet amounts and the number of compared cards.

As illustrated in FIG. 15, the number of the compared cards is determined out of 1 to 3 in accordance with the side bet amount.

Further, the case has been described where the compared attributes are selected by the player in the first embodiment. However, in the second embodiment, the compared cards are determined by a random lottery in the gaming machine.

In the following, the same signs are applied to constituent elements that are same as the constituent elements of the gaming machine 1 according to the first embodiment.

Further, omitted are descriptions of parts to which descriptions in the first embodiment are applicable in a second embodiment.

FIG. 16A to FIG. 16D are views each illustrating an exemplary image displayed on a liquid crystal display in a gaming machine according to the second embodiment.

Figure 16A:
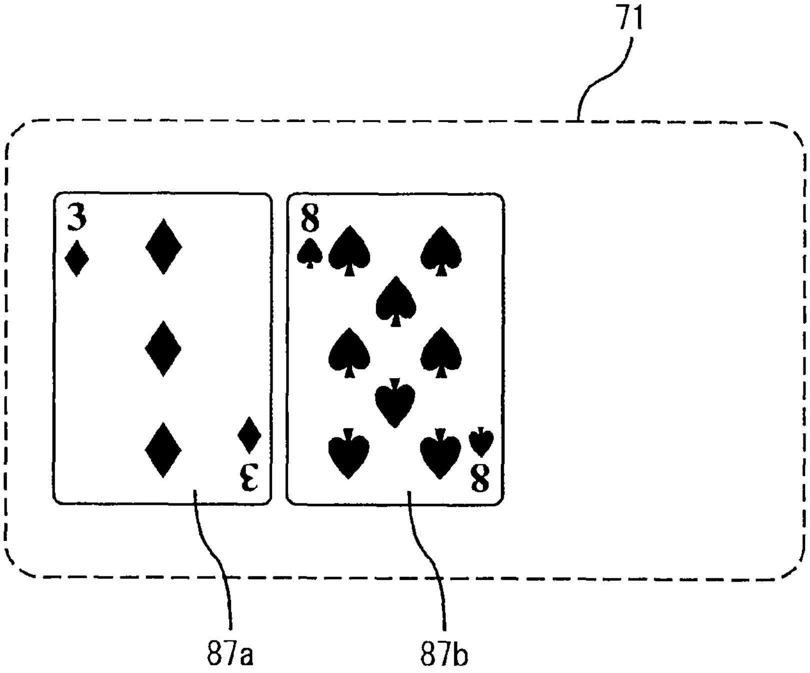
FIG. 16A is a view illustrating an exemplary image displayed on a liquid crystal display in a gaming machine according to a second embodiment.

FIG. 16A illustrates two player initial cards 87 (player initial cards 87*a*, 87*b*) displayed in the player card display area 71.

After the display of two player initial cards 87, the player can place a side bet by touching the side bet button 86. After the placement of the side bet by the player, the compared cards are determined by a random lottery in number according to the side bet amount.

Figure 16B:
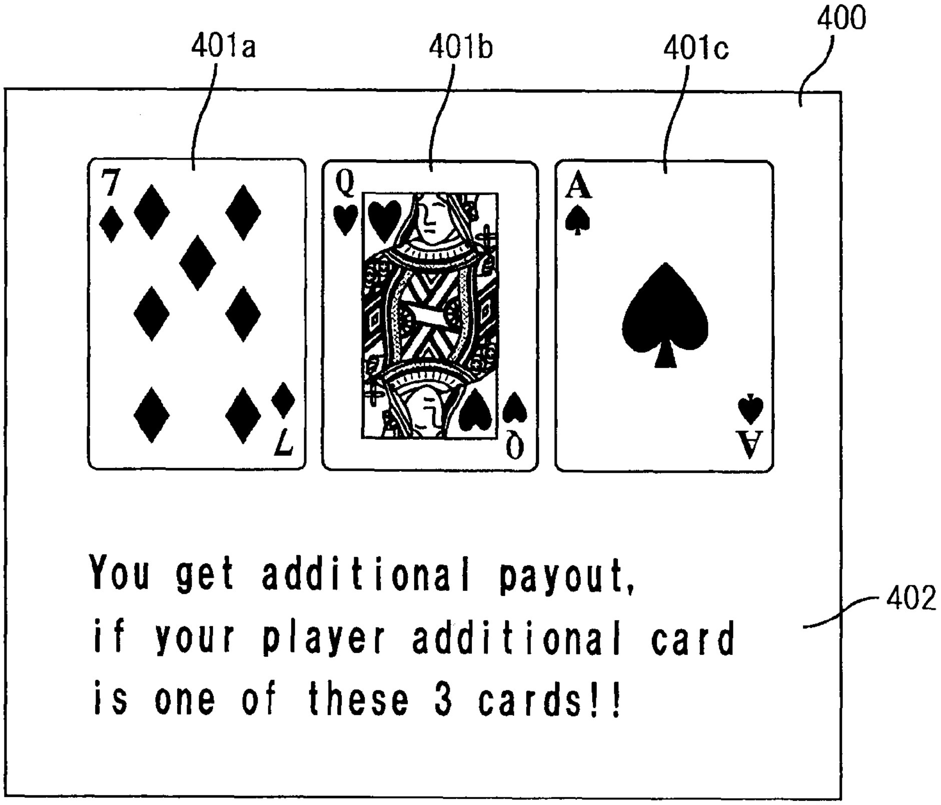
FIG. 16B is a view illustrating an exemplary image displayed on the liquid crystal display in the gaming machine according to the second embodiment.

FIG. 16B illustrates three compared cards 86 (compared card 86*a*, compared card 86*b*, compared card 86*c*), which have been determined by a random lottery, displayed in a compared-card display area 400. In the second embodiment, the compared-card display area 400 is provided instead of the display area 300 of compared-attribute selection buttons in the first embodiment.

A character image 402 indicates that the additional payout is offered when any of the compared cards 401*a* to 401*c* is same as the player additional card.

Figure 16C:
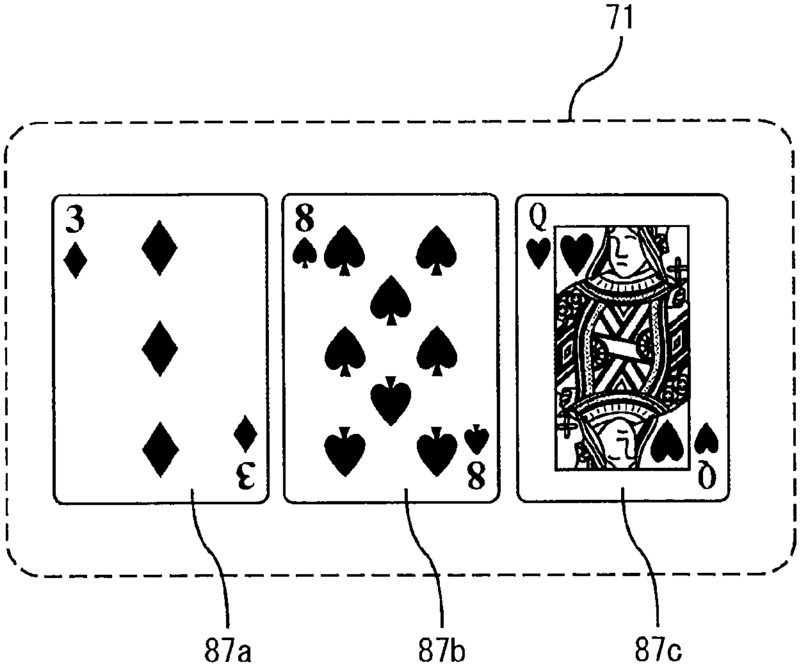
FIG. 16C is a view illustrating an exemplary image displayed on the liquid crystal display in the gaming machine according to the second embodiment.

After that, when the player selects "hit" or "double down", a player additional card is distributed to the player. FIG. 16C illustrates a player additional card 87*c* displayed in the player card display area 71 in addition to the player initial cards 87*a* and 87*b*.

Here, it is to be noted that the player additional card 87*c* is same as the compared card 401*b*. In this case, the result of the side game is "PERFECT NUMBER".

Figure 16D:
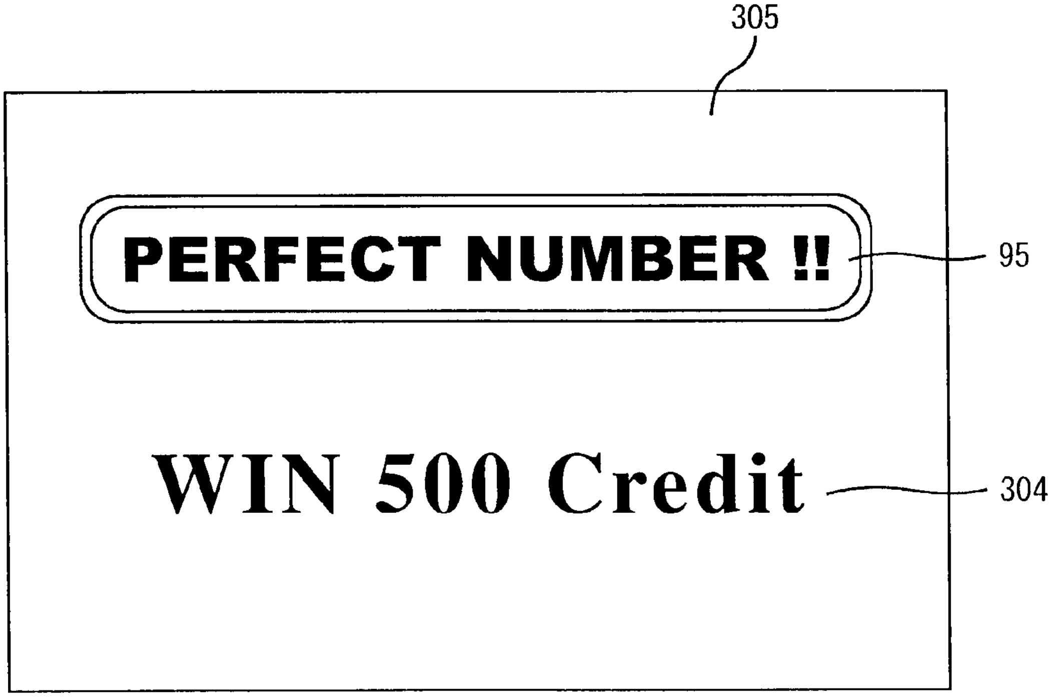
FIG. 16D is a view illustrating an exemplary image displayed on the liquid crystal display in the gaming machine according to the second embodiment.

In the case illustrated in FIG. 16D, the side-game-result image 95 is an image corresponding to characters "PERFECT NUMBER" because the result of the side game is "PERFECT NUMBER".

Further, the additional-payout image 304 illustrates that the additional payout amount is 500 (50×10) credits as the side-betted credit amount is 10 and the result of the side game is "PERFECT NUMBER".

Figure 17:
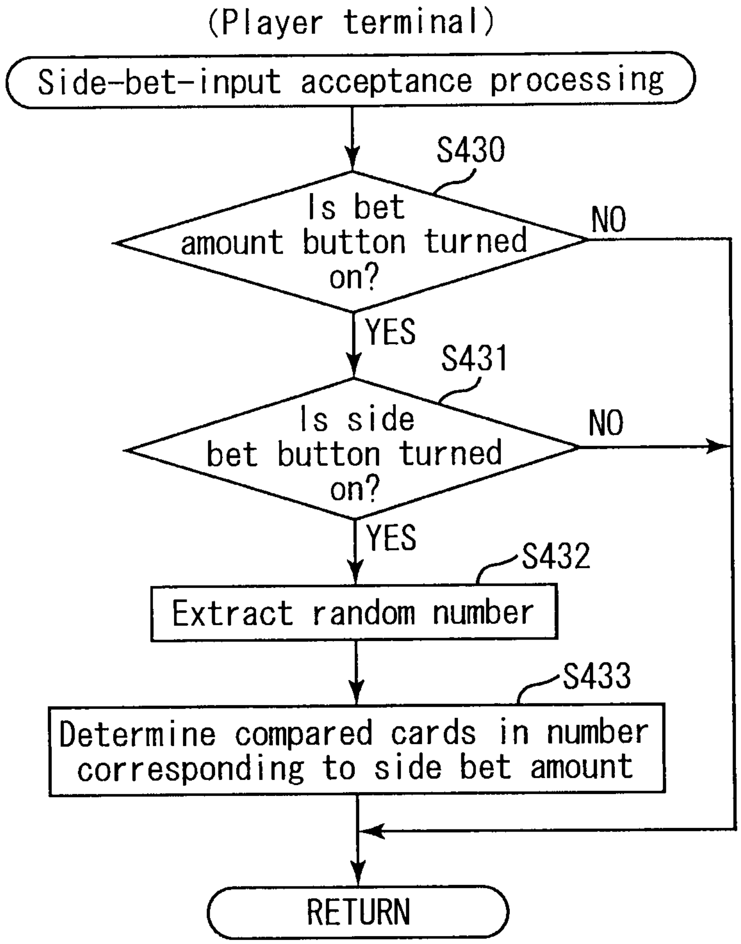
FIG. 17 is a flowchart illustrating a subroutine of side-bet-input acceptance processing executed in each player terminal.

FIG. 17 is a flowchart illustrating a subroutine of the side-bet-input acceptance processing executed in each player terminal.

First, the CPU 51 executes the processing of step S430 to step S431. The processing is the same as the processing of step S230 to step S231 of FIG. 12, and thus the descriptions thereof are omitted here.

When determining that the side bet button has been turned on in step S431, the CPU 51 extracts random numbers in number corresponding to the side bet amount (step S432).

Then, the CPU 51 determines the compared cards in number corresponding to the number of random numbers based on the respective extracted random numbers (step S433). Namely, the compared cards in number corresponding to the side bet amount are determined.

Then, the CPU 51 completes the present subroutine.

Figure 18:
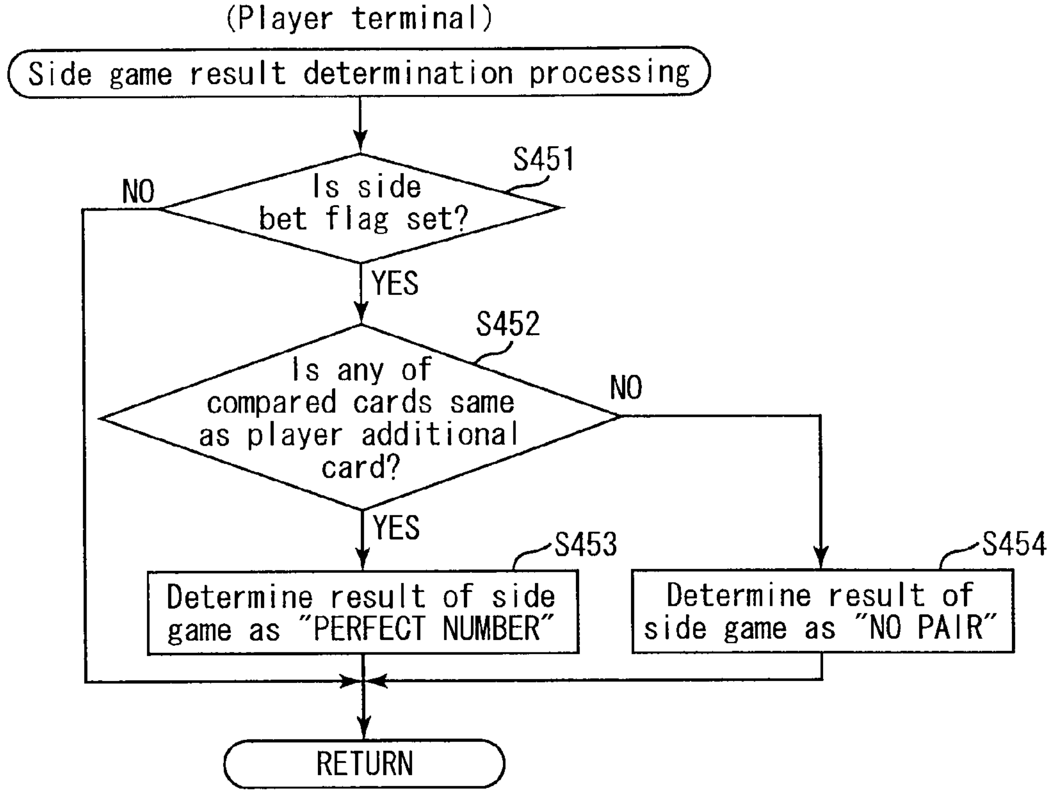
FIG. 18 is a flowchart illustrating a subroutine of side game result determination processing executed in each player terminal.

FIG. 18 is a flowchart illustrating a subroutine of side game result determination processing executed in each player terminal.

First, the CPU 51 determines whether or not the side bet flag is set in the RAM 52 (step S451).

When determining the side bet flag is not set, the CPU 51 completes the present subroutine.

On the other hand, when determining the side bet flag is set, the CPU 51 determines whether or not any of the compared cards determined in step S433 of FIG. 17 is same as the player additional card displayed in step S206 of FIG. 11 (step S452).

When determining any one of the compared cards is same as the player additional card, the CPU 51 determines the result of the side game as "PERFECT NUMBER" (step S453).

On the other hand, when determining none of the compared cards is same as the player additional card, the CPU 51 determines the result of the side game as "NO PAIR" (step S454).

After the processing of step S453 or step S454, the CPU 51 completes the present subroutine.

As above, the second embodiment has been described.

In the second embodiment, the case has been described where the compared cards in number corresponding to the side bet amount are determined as the compared attribute.

However, the compared attribute in the present invention is not limited to this case, and examples thereof may include:

(I) the numbers in number corresponding to the side bet amount; and (II) the suits in number corresponding to the side bet amount.

In the case of (I), an additional payout may be offered when any of the numbers determined as the compared attributes is same as the number drawn on the player additional card.

Further, in the case of (II), an additional payout may be offered when any of the suits determined as the compared attributes is same as the suit drawn on the player additional card.

According to the gaming machine 1 of the second embodiment and a playing method thereof, the number of the compared cards may increase along with the increase of the side bet amount. Therefore, the probability that the compared card is same as the player additional card may be increased. Accordingly, the gaming machine 1 encourages the player who wishes to get the additional payout to bet a larger amount of side bet, resulting in the profit increase of the casino.

In addition, after comparing the player additional card with one compared card, the player can further compare the player additional card with another compared card. Accordingly, the player is allowed to fully enjoy comparing of the player additional card with the compared card.

In the second embodiment, the case has been described where the relationship between the side bet amount and the number of compared card is set as illustrated in FIG. 15. Accordingly, in the present invention, it is possible to set the number of compared attributes is constant when the side bet amount is equal to or more than the predetermined amount. In such a case, the additional payout amount may be set to be constant when the side bet amount is less than the predetermined amount, and the additional payout amount may be determined based on the side bet amount when the side bet amount is equal to or more than the predetermined amount.

In the present invention, the relationship between the amount of side-betted game media and the number of compared attributes is not limited to this example. For example, the number of compared attributes may be reduced along with the increase of the side bet amount. In such a case, the additional payout amount becomes larger along with the increase of the side bet amount.

[Third Embodiment]

In the following, the same signs are applied to constituent elements that are same as the constituent elements of the gaming machine 1 according to the first embodiment.

Further, omitted are descriptions of parts to which descriptions in the first embodiment are applicable in a third embodiment.

First, an outline of the third embodiment is described with reference to FIG. 19.

FIG. 19 is a table illustrating relationships between the totals just before Double Down and success rates of Double Down.

In the third embodiment, the RAM 42 stored in the main control portion 31 stores Double-Down success rate data indicative of the success rate of Double Down in association with the total just before Double Down.

In the following, data indicative of the relationship between the totals just before Double Down and success rates of Double Down is also referred to as historic data.

The success rate of Double Down indicates the probability of the player's winning in the Blackjack game by selecting "Double Down", and corresponds to the total of the numbers drawn on a plurality of cards displayed in the player card display area 71 at selection (the total just before Double Down).

In the third embodiment, the player can place a side bet when the total of the numbers drawn on a plurality of cards displayed in the player card display area 71 is the total of numbers indicated by Double-Down high success rate data.

The Double-Down high success rate data is data indicative of the total just before Double Down (high-success-rate total) associated with relatively high success rate of Double Down.

The Double-Down high success rate data corresponds to the data of high success rate with special additional command of the present invention.

In the third embodiment, the high-success-rate totals include the totals just before Double Down associated with the highest, second highest, and third highest success rates of Double Down.

FIG. 19 illustrates "11", "10", and "9" specified as the high-success-rate totals.

In this case, the player can place a side bet on condition that the total of the numbers drawn on the plurality of cards displayed in the player card display area is "11", "10", or "9".

Figure 20:
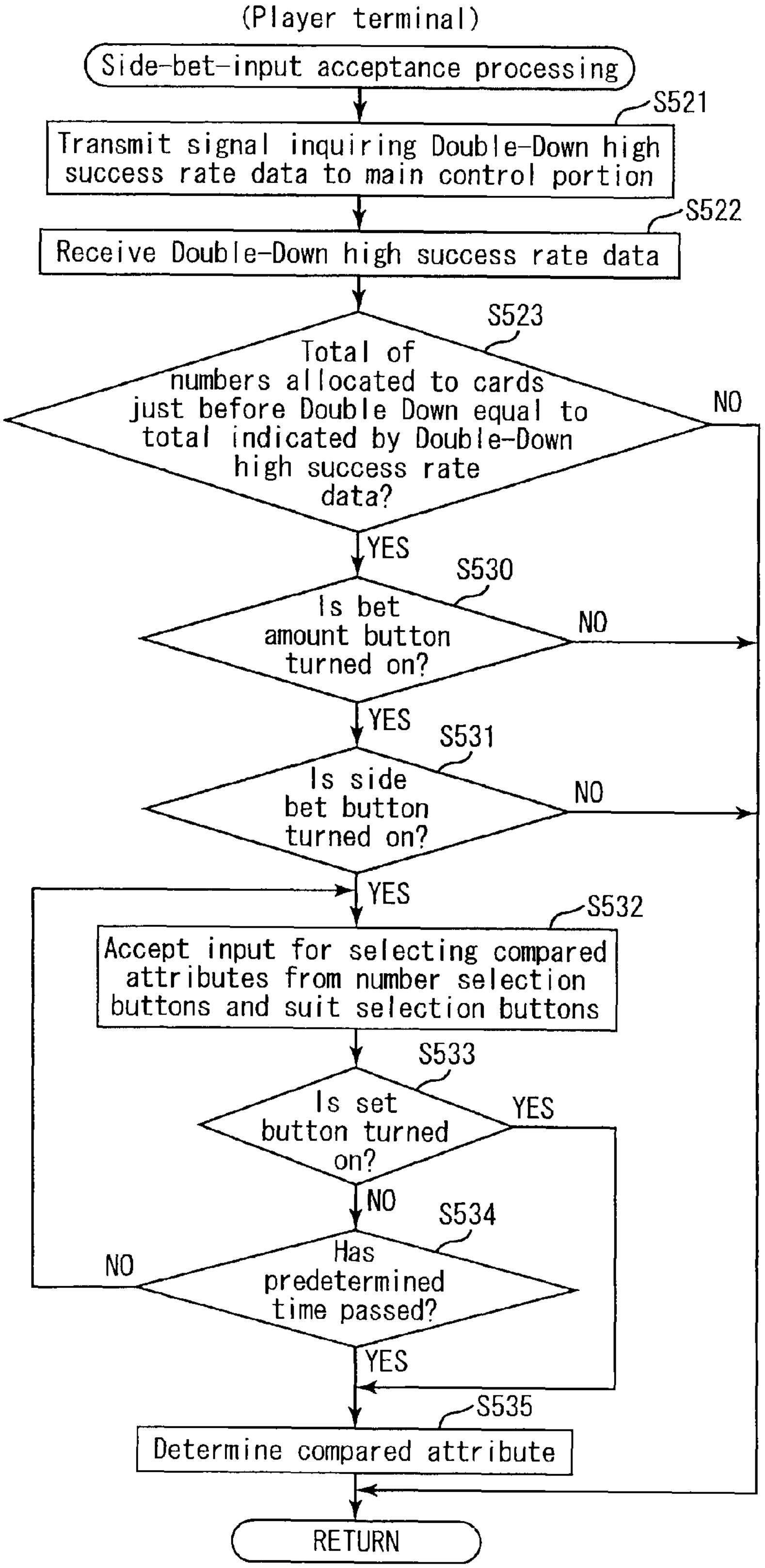
FIG. 20 is a flowchart illustrating a subroutine of side-bet-input acceptance processing executed in each player terminal.

FIG. 20 is a flowchart illustrating a subroutine of side-bet-input acceptance processing executed in each player terminal.

First, the CPU 51 transmits a signal inquiring Double-Down high success rate data to the main control portion 31 (step S521).

Here, the reception processing of a signal inquiring Double-Down high success rate data executed in the main control portion 31 is described.

Figure 21:
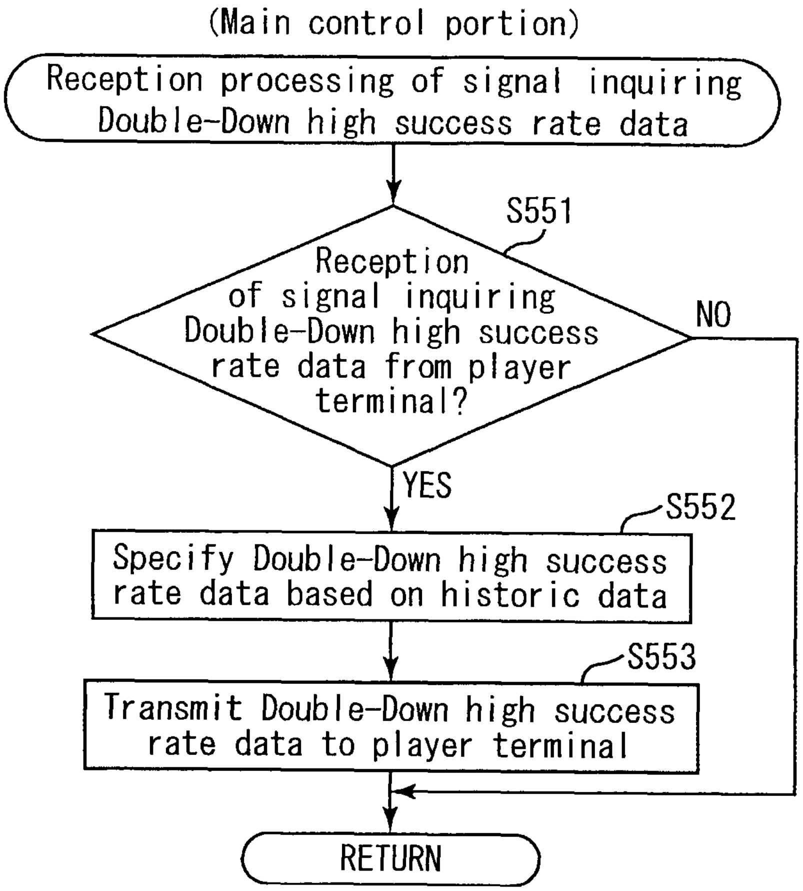
FIG. 21 is a flowchart illustrating a subroutine of a reception processing of a signal inquiring Double-Down high success rate data.

FIG. 21 is a flowchart illustrating a subroutine of a reception processing of a signal inquiring Double-Down high success rate data.

First, the CPU 41 determines whether or not it has received a signal inquiring Double-Down high success rate data from any of the player terminals 4 at a predetermined timing (step S551).

When determining it has not received the signal inquiring Double-Down high success rate data, the CPU 41 completes the present subroutine.

On the other hand, when determining it has received the signal inquiring Double-Down high success rate data, the CPU 41 specifies the Double-Down high success rate data based on the historic data (see FIG. 19) stored in the RAM 42 (step S552). FIG. 19 illustrates an example in which "11", "10", and "9" are specified as Double-Down high success rate data.

Next, the CPU 41 transmits the specified Double-Down high success rate data to the player terminal 4 that has transmitted the signal inquiring Double-Down high success rate data received in step S551 (step S553).

After that, the CPU 41 completes the present subroutine.

Now, FIG. 20 is described again.

After the processing of step S521, the CPU 51 receives the Double-Down high success rate data from the main control portion 31 (step S522). Then, the CPU 51 stores the received Double-Down high success rate data in the RAM 52.

Next, the CPU 51 determines whether or not the total of the numbers drawn on the plurality of cards displayed in the player card display area 71 is the total indicated by the Double-Down high success rate data received in step S522 (step S523).

When determining the total of the numbers drawn on the plurality of cards is not the total indicated by the Double-Down high success rate data, the CPU 51 completes the present subroutine.

On the other hand, when determining the total of the numbers drawn on the plurality of cards is the total indicated by the Double-Down high success rate data, the CPU 51 executes the processing of step S530 to step S535. Namely, the player is allowed to place a side bet when the total just before Double Down is the high-success-rate total ("11", for example).

The processing of step S530 to step S535 is the same as the processing of step S230 to step S235 of FIG. 12, and thus the descriptions thereof are omitted here.

Figure 22:
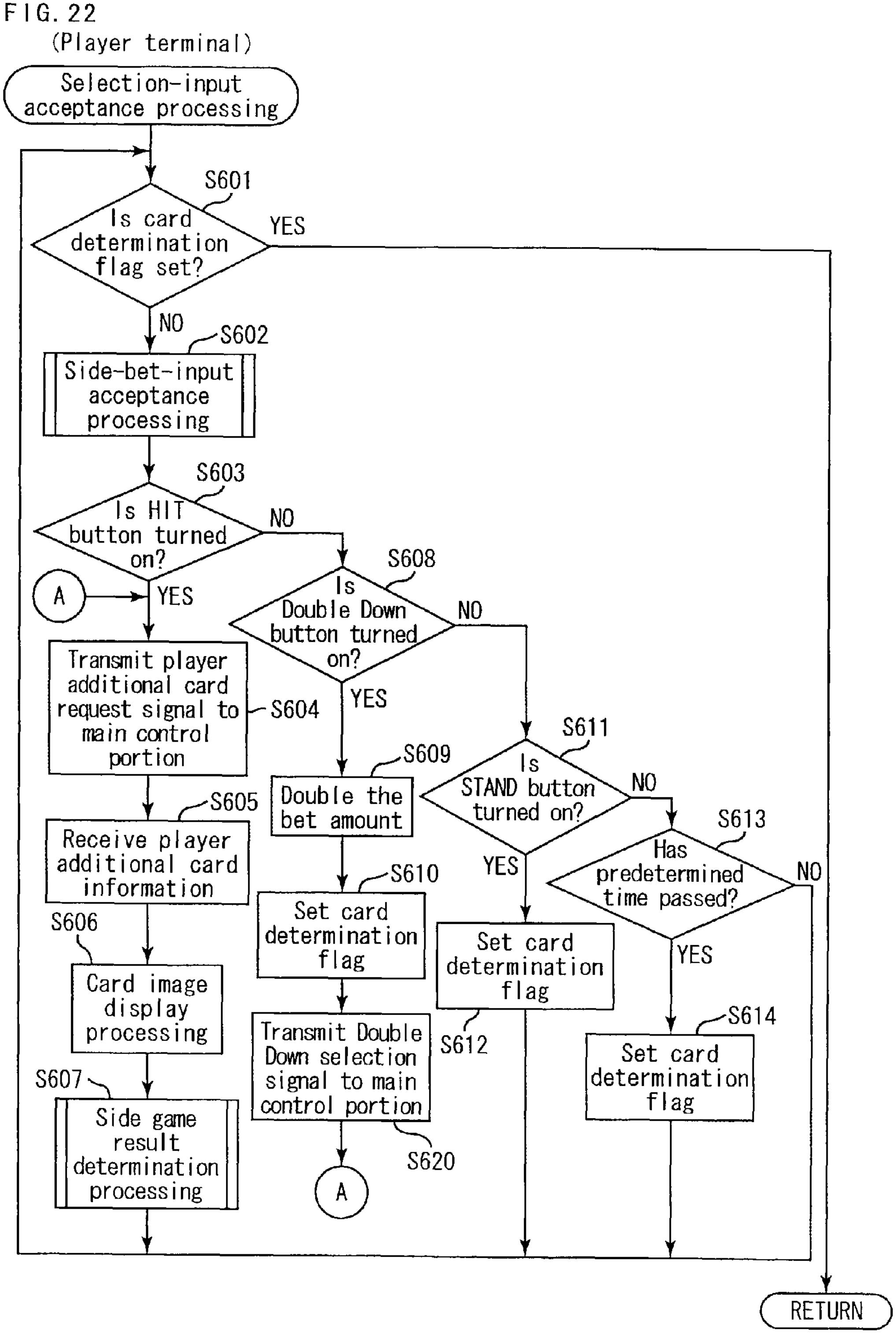
FIG. 22 is a flowchart illustrating a subroutine of selection-input acceptance processing executed in each player terminal.

FIG. 22 is a flowchart illustrating a subroutine of selection-input acceptance processing executed in each player terminal The processing of step S601 to step S614 is the same as the processing of step S201 to step S214 of FIG. 11, and thus the descriptions thereof are omitted here.

After the processing of step S610, the CPU 51 transmits a Double Down selection signal to the main control portion 31 (step S620).

After that, the CPU 51 shifts the processing to step S604.

Figure 23:
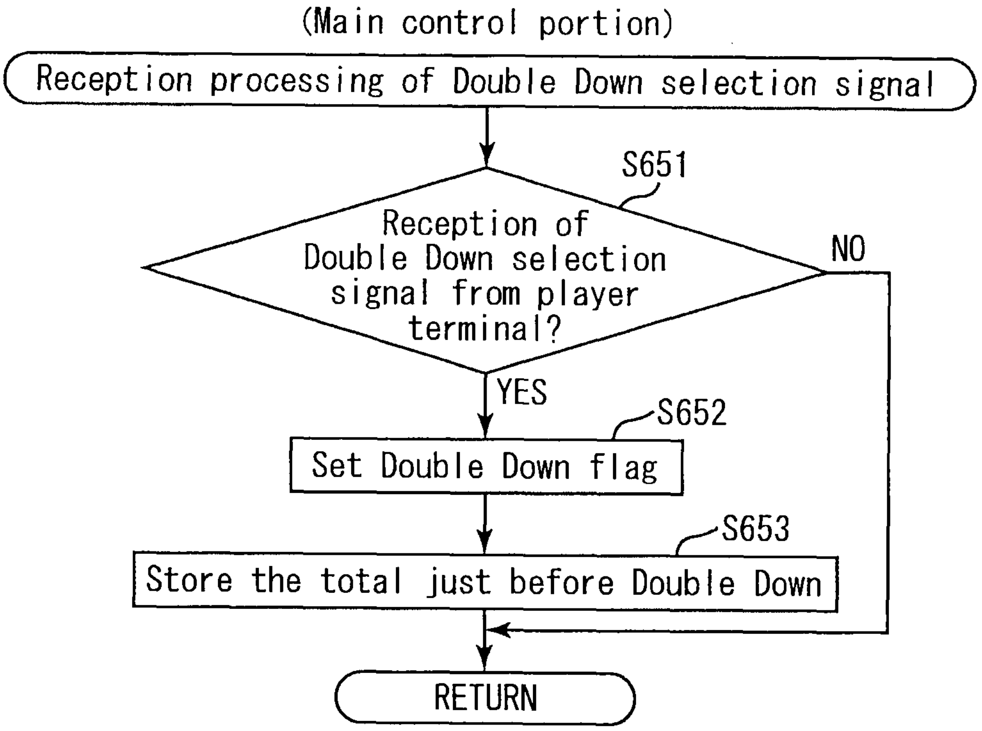
FIG. 23 is a flowchart illustrating a subroutine of a reception processing of a Double Down selection signal.

FIG. 23 is a flowchart illustrating a subroutine of a reception processing of a Double Down selection signal First, the CPU 41 determines whether or not it has received a Double Down selection signal from any of the player terminals 4 at a predetermined timing (step S651).

When determining it has not received the Double Down selection signal, the CPU 41 completes the present subroutine.

When determining it has received the Double Down selection signal, the CPU 41 sets a Double Down flag in the RAM 42. The Double Down flag is cleared when the current Blackjack game ends (after the processing of step S12 of FIG. 10).

Next, the CPU 41 stores the total just before Double Down in the RAM 42 in association with the player terminal 4 that has transmitted the Double Down selection signal received in step S651 (step S653). In this processing, the CPU 41 stores the total of the numbers drawn on a plurality of cards displayed on the liquid crystal display 10 of the player terminal 4 in the RAM 42 based on card information (player initial card information and player additional card information). The card information is stored in the RAM 42 and has been transmitted to the player terminal 4.

After that, the CPU 41 completes the present subroutine.

Figure 24:
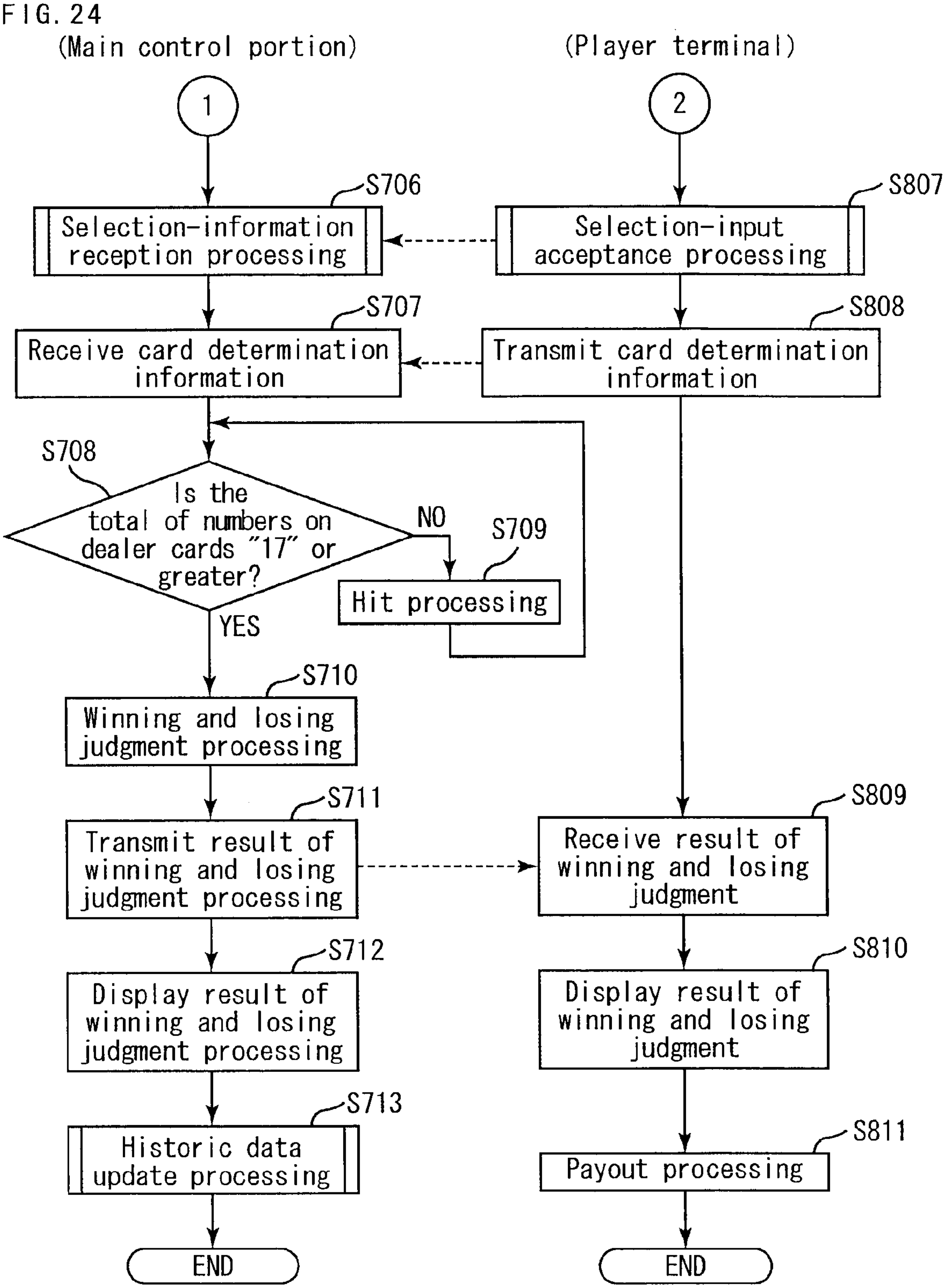
FIG. 24 is a flowchart of a game processing program of the gaming machine.

FIG. 24 is a flowchart of a game processing program of the gaming machine.

The processing of step S706 to step S712 is the same as the processing of step S6 to step S12, and thus the descriptions thereof are omitted here. Further, the processing of step S807 to step S811 is the same as the processing of step S107 to step S111, and thus the descriptions thereof are omitted here.

After the processing of step S712, the CPU 41 executes historic data update processing (step S713).

Here, the historic data update processing is described with reference to FIG. 25.

Figure 25:
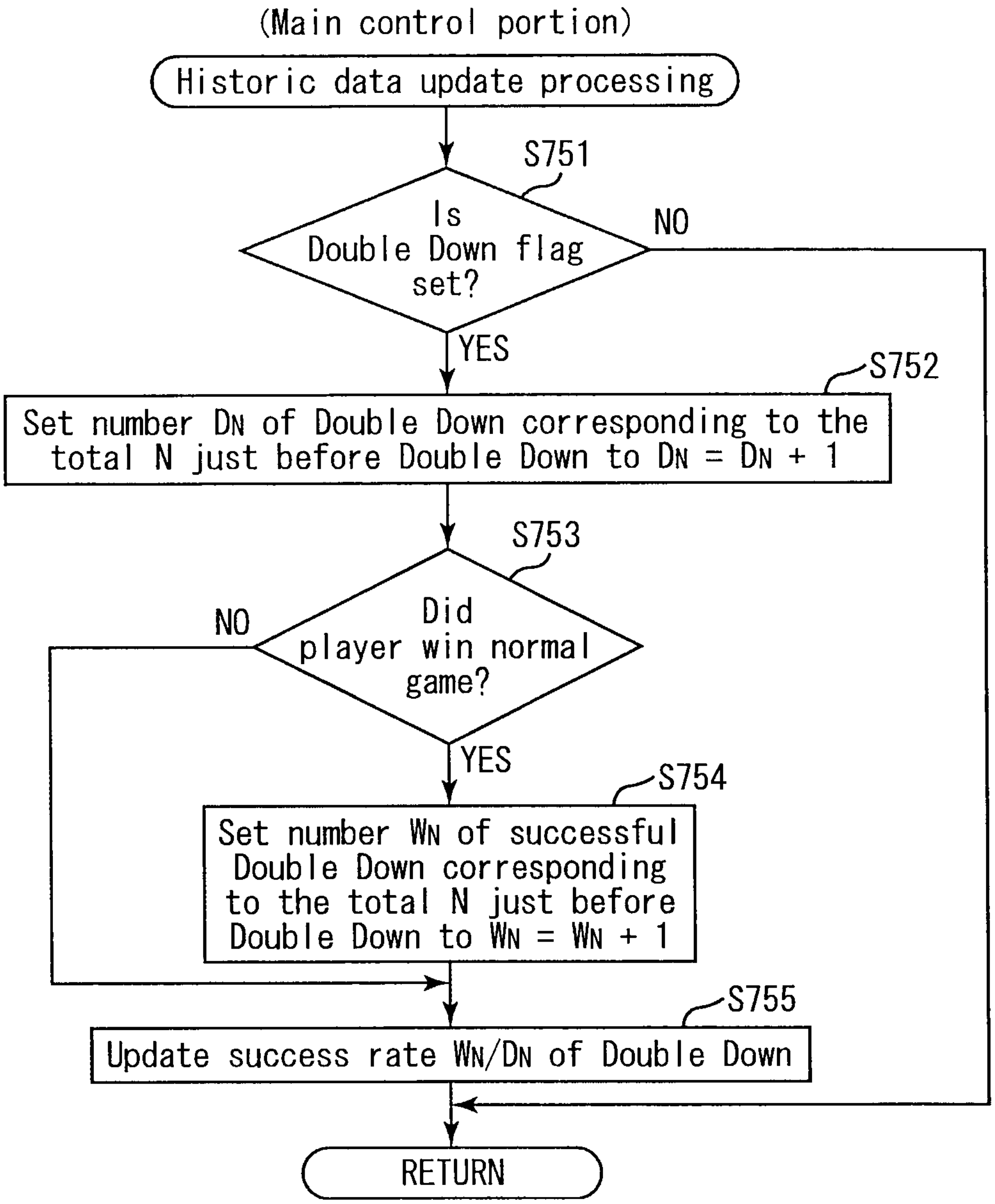
FIG. 25 is a flowchart illustrating a subroutine of a historic data update processing.

FIG. 25 is a flowchart illustrating a subroutine of a historic data update processing.

First, the CPU 41 determines whether or not the Double Down flag (see step S65 of FIG. 23) is set in the RAM 42 (step S751).

When determining the Double Down flag is not set, the CPU 41 completes the present subroutine.

On the other hand, when determining the Double Down flag is set, the CPU 41 sets the number $D_N$ of Double Down corresponding to the total N just before Double Down to $D_N=D_N+1$ in the RAM 42 (step S752). Here, N is the total just before Double Down stored in the RAM 42 in step S653 of FIG. 23.

Next, the CPU 41 determines whether or not the result of the Blackjack game determined in step S710 is player's winning (step S753).

When determining the player has won the Blackjack game, the CPU 41 sets the number $W_N$ of successful Double Down corresponding to the total N just before Double Down to $W_N=W_N+1$ in the RAM 42 (step S754). Here, N is the total just before Double Down stored in the RAM 42 in step S653 of FIG. 23.

When determining the player has not won the Blackjack game in step S753 or after the processing of step S754, the CPU 41 updates the success rate $W_N/D_N$ of Double Down associated with the total N just before Double Down in the RAM 42 based on the number $D_N$ of Double Down and the number $W_N$ of successful Double Down stored in the RAM 42 (step S755). Here, N is the total just before Double Down stored in the RAM 42 in step S653 of FIG. 23.

Then, the CPU 41 completes the present subroutine.

As above, according to the gaming machine 1 of the third embodiment and a playing method thereof, an input for placing a side bet is accepted on condition that cards having distributed to the player are the cards with which the player would have a relatively-high probability of winning in the Blackjack game with one more player additional card. Namely, an input for placing a side bet is accepted when the timing of selecting "Double Down" has come. Accordingly, the player can know the timing of placing a side bet by checking whether or not the side bet can be placed. In this manner, the gaming machine can inform even a beginner player when to select "Double Down".

In addition, such information about when to select "Double Down" may surprise the player.

When "Double Down" is selected, only one more player additional card is distributed. Accordingly, the player additional card to be distributed next determines the result of the Blackjack game. In this context, the type of the card to be distributed as the player additional card is significantly important for the player. Therefore, the player has a strong feeling of hope for a good player additional card.

According to the gaming machine 1 of the third embodiment and the playing method thereof, the player additional card that already raises the player's hope also determines the result of the side game. Therefore, the player tends to have a greater hope for a good player additional card.

In the third embodiment, Double-Down high success rate data (see step S552 of FIG. 21) specified based on the historic data is stored in the RAM 52 (see step S522 of FIG. 20). The RAM 52 corresponds to the memory of the present invention.

However, the memory of the present invention is not limited to this case. The memory of the present invention may be a ROM preliminary storing data of high success rate with special additional command (data indicative of "10" and "11", for example).

In the above embodiments (First Embodiment to Third Embodiment), the player cards are displayed on the liquid crystal display 10 and on the front display 21, while the dealer cards are displayed on the front display 21. The liquid crystal display 10 and the front display 21 correspond to the display of the present invention. The display of the present invention may include multiple displays as above, or may include one display.

In the above embodiments, the player can input a command in the game such as selection of "hit" or "double down" by using the touch panel 11. The touch panel 11 corresponds to the input device of the present invention. The input device of the present invention is not particularly limited, and a conventionally known input device such as buttons and the like maybe used. Further, as an input device with which a player places a normal bet and a side bet, a currency insertion slot through which a currency such as a coin and a bill can be inserted may be used.

In the above embodiments, the processing executed in the gaming machine 1 is conducted by the CPU 41 of the main control portion 31 together with the CPU 51 of each player terminal 4. The CPU 41 and the CPU 51 constitute the controller of the present invention. In this way, the controller of the present invention may have multiple CPUs, or may have one CPU.

In the above embodiments, two attributes including the number and the suit are allocated as the attributes of the card. However, the types and the number of the attributes of the card of the present invention are not particularly limited. For example, the card may have the third attribute of a predetermined picture drawn thereon, in addition to the number and the suit. In such a case, the compared attributes may be determined as a combination of the attributes such as "number and picture", "picture and suit", and "number, suit, and picture".

In the third embodiment, a player can place a side bet when the total of the numbers drawn on the plurality of cards displayed in the player card display area 71 is the high-success-rate total.

However, in the present invention, the timing when a player can place a side bet is not limited to this case. For example, a player may be allowed to place a side bet on condition that a special additional command is inputted. This may further increase the player's feeling of hope for a good player additional card.

In the present invention, the special additional command may be accepted on condition that a side bet has been placed. In such a case, the player cannot input a special additional command unless a side bet has been placed, and therefore, it is possible to avoid a wrong operation of inputting a special additional command though the timing of inputting a special additional command has not come.

In the above embodiments, a Blackjack game is played in the gaming machine 1.

Figure 26:
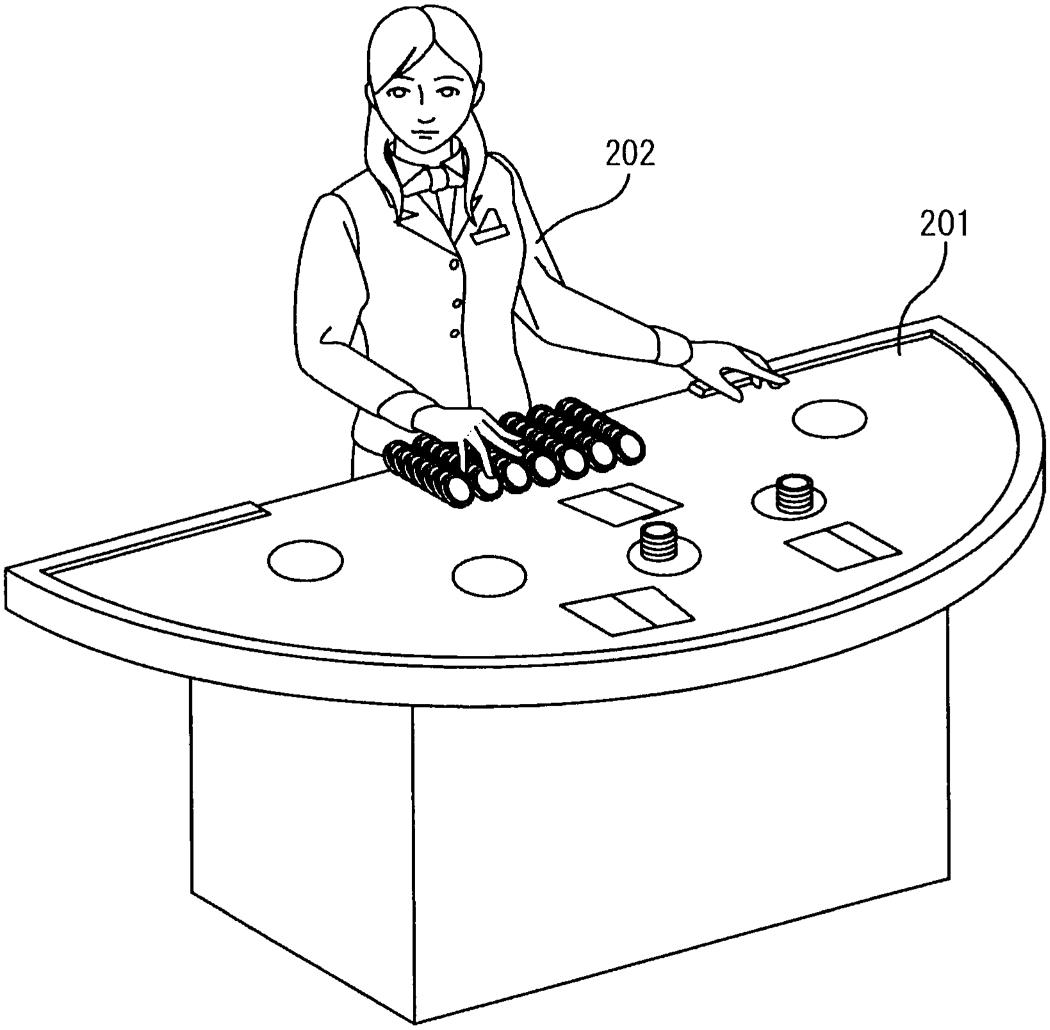
FIG. 26 is a schematic view illustrating an example of a table game in which the present invention is applied.

However, the playing method of a card game according to the present invention can also be applied to a card game (so called table game) in which a dealer 202 and a player (not shown) play on a gaming table 201, as shown in FIG. 26.

In the above embodiments, a Blackjack game is played as a normal game. However, the normal game of the present invention is not limited to a Blackjack game. The normal game of the present invention may be a card game such as poker.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol; a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step should become apparent from the above descriptions.

What is claimed as new and desired to be secured by Letters Patent of the United States is:

1. A gaming machine comprising:

a display capable of displaying a plurality of cards;

an input device configured to input a command; and a controller, the controller programmed to execute the processing of:

(A) accepting an input for placing a normal bet from the input device in a primary game;

(B) displaying a player initial card on the display in the primary game;

(C) accepting an input of an additional command from the input device after the player initial card is displayed, the additional command for displaying a player additional card in the primary game that is different from the player initial card;

(D) accepting an input from the input device for placing a side bet in the primary game different from the normal bet after display of the player initial card and before display of the player additional card;

(E) randomly determining one or more possible attributes of the player additional card in the primary game as a result of placing the side bet, wherein a number of the one or more randomly determined possible attributes increases based on the amount of game media wagered on the side bet, and wherein the one or more randomly determined possible attributes is to be compared with an actual attribute of the player additional card;

(F) displaying the player additional card on the display in the primary game when the additional command is inputted in the processing (C);

(G) determining, during the primary game, when the side bet is placed in the processing (D), a result of the side bet by determining whether or not the actual attribute of the player additional card displayed in the processing (F) is same as one or more of the randomly determined possible attributes of the player additional card determined in the processing (E);

(H) displaying dealer cards on the display;

(I) determining, during the primary game, a result of the normal bet based on the dealer cards displayed in the processing (H) and player cards specified by the player initial card displayed in the processing (B) and the player additional card displayed in the processing (F); and (J) offering a normal payout during the primary game based on the result of the normal bet determined in the processing (I), and an additional payout during the primary game based on the result of the side bet determined in the processing (G), wherein the result of the side bet is based on one or more attributes of the player additional card and is not based on the player initial cards.

2. The gaming machine according to claim 1, wherein each card has a first attribute and a second attribute, the processing (E) includes determining a possible first attribute and a possible second attribute of a card to be compared with an actual first attribute and an actual second attribute of the player additional card, and the processing (G) includes determining, when the side bet is placed in the processing (D), the result of the side bet by determining whether or not at least one of the possible first attribute and the possible second attribute of the player additional card displayed in the processing (F) is same as the actual first attribute or the actual second attribute of the card determined in the processing (E).

3. The gaming machine according to claim 1, wherein each card has a number, the processing (I) includes determining the result of the primary game by comparing a total of the numbers allocated to the player cards and a total of the numbers allocated to the dealer cards, the additional command includes a special additional command for further betting game media aside from the normal bet in the processing (A) and for displaying the player additional card, the processing (C) includes accepting the input of the additional command from the input device on condition that the special additional command is not inputted, the processing (J) includes paying out, when the special additional command is inputted in the processing (C), more game media compared to a case where the special additional command is not inputted as the normal payout, the gaming machine further includes a memory for storing data of high success rate with special additional command indicative of a total of the numbers allocated to the player cards, the total of the numbers indicating a comparatively high probability of player's winning in the primary game with the special additional command inputted, the controller is further programmed to execute the processing of (K) determining, based on the data of high success rate with special additional command stored in the memory, whether or not the total of the numbers allocated to the player initial card displayed in the processing (B) and the player additional cards displayed in the processing (F) is same as the total of the numbers indicated by the data of high success rate with special additional command, and the processing (D) includes accepting an input for placing the side bet from the input device, when determining the total of the numbers allocated to the player initial card displayed in the processing (B) and the player additional cards displayed in the processing (F) is same as the total of the numbers indicated by the data of high success rate with special additional command in the processing (K).

4. A gaming machine comprising:

a display capable of displaying a plurality of cards;

an input device configured to input a command in a game; and a controller, the controller programmed to execute the processing of:

(A) accepting an input for placing a normal bet from the input device in a primary game;

(B) displaying a player initial card on the display in the primary game;

(C) accepting an input of an additional command from the input device after the player initial card is displayed, the additional command for displaying a player additional card in the primary game that is different from the player initial card;

(D) accepting an input from the input device for placing a side bet in the primary game different from the normal bet after display of the player initial card and before display of the player additional card;

(E) accepting an input from the input device for selecting one or more possible attributes of the player additional card in the primary game as a result of placing the side bet, the one or more possible attributes selectable from among a plurality of selectable attributes, which one or more possible attributes are to be compared with one or more actual attributes of the player additional card;

(F) displaying the player additional card on the display in the primary game when the additional command is inputted in the processing (C);

(G) determining, when the side bet is placed in the processing (D), a result of the side bet by determining whether or not the one or more actual attributes of the player additional card displayed in the processing (F) is same as the one or more possible attributes of the player additional card selected in the processing (E);

(H) displaying dealer cards on the display;

(I) determining, in the primary game, a result of the normal bet based on the dealer cards displayed in the processing (H) and player cards specified by the player initial card displayed in the processing (B) and the player additional card displayed in the processing (F); and (J) offering a normal payout during the primary game based on the result of the normal bet determined in the processing (I), and an additional payout during the primary game based on the result of the side bet determined in the processing (G)), wherein the amount of the additional payout is determined by reference to a side game payout table and correspondence between the one or more possible attributes selected and the actual attributes of the player additional card;

wherein the result of the side bet is based on the one or more attributes of the player additional card and is not based on the player initial cards.

5. The gaming machine of claim 4 wherein, despite correspondence between one or more possible attributes of a player additional card selected and one or more actual attributes of the player additional card, the additional payout, based on the payout table, is zero.

6. A playing method of a card game, the method comprising the steps of, with a controller of a gaming machine:

(A) accepting a normal bet in a primary game;

(B) distributing a player initial card to a player in a primary game;

(C) accepting an additional command for requesting distribution of a player additional card in the primary game different from the player initial card after the player initial card is distributed;

(D) accepting a side bet different from the normal bet in the primary game after distribution of the player initial card and before distribution of the player additional card;

(E) randomly determining one or more possible attributes of a card to be compared with one or more actual attributes of the player additional card, wherein a number of the one or more randomly determined possible attributes increases based on the amount of game media wagered on the side bet;

(F) distributing the player additional card to the player when the additional command is made in the step (C);

(G) determining, when the side bet is placed in the step (D), a result of the side bet by determining whether or not the one or more actual attributes of the player additional card distributed in the step (F) is same as the one or more possible attributes of the card determined in the step (E);

(H) distributing dealer cards to a dealer;

(I) determining a result of a normal bet based on the dealer cards distributed in the step (H) and player cards specified by the player initial card distributed in the step (B) and the player additional card distributed in the step (F); and (J) offering a normal payout based on the result of the normal bet determined in the step (I) and an additional payout based on the result of the side bet determined in the step (G), wherein the result of the side bet is based on the one or more attributes of the player additional card and is not based on the player initial cards.

* * * * *